(12) United States Patent
Kinghorn et al.

(10) Patent No.: US 8,341,407 B2
(45) Date of Patent: *Dec. 25, 2012

(54) METHOD AND SYSTEM FOR PROTECTING ELECTRONIC DATA IN ENTERPRISE ENVIRONMENT

(75) Inventors: Gary Mark Kinghorn, Emerald Hills, CA (US); Denis Jacques Paul Garcia, Palo Alto, CA (US)

(73) Assignee: Guardian Data Storage, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/078,109

(22) Filed: Apr. 1, 2011

(65) Prior Publication Data

US 2011/0296199 A1     Dec. 1, 2011

Related U.S. Application Data

(63) Continuation of application No. 10/159,220, filed on May 31, 2002, now Pat. No. 7,921,284, which is a continuation-in-part of application No. 10/074,804, filed on Feb. 12, 2002, now Pat. No. 7,380,120.

(60) Provisional application No. 60/339,634, filed on Dec. 12, 2001.

(51) Int. Cl.
*H04L 29/06* (2006.01)

(52) U.S. Cl. .......................... 713/166; 713/160

(58) Field of Classification Search ................. 713/166, 713/182, 189, 160; 726/2; 380/277
See application file for complete search history.

(56) References Cited

U.S. PATENT DOCUMENTS

| | | | |
|---|---|---|---|
| 4,203,166 A | 5/1980 | Ehrsam et al. |
| 4,238,854 A | 12/1980 | Ehrsam et al. |
| 4,423,287 A | 12/1983 | Zeidler |
| 4,423,387 A | 12/1983 | Sempel |

(Continued)

FOREIGN PATENT DOCUMENTS

EP        0 672 991 A2      9/1995

(Continued)

OTHER PUBLICATIONS

Adobe Acrobat 5.0 Classroom in a Book, Adobe Press, Jun. 26, 2001, pp. 1-4.

(Continued)

*Primary Examiner* — Ali Abyaneh

(74) *Attorney, Agent, or Firm* — Sterne, Kessler, Goldstein & Fox PLLC

(57) ABSTRACT

Even with proper access privilege, when a secured file is classified, at least security clearance (e.g. a clearance key) is needed to ensure those who have the right security clearance can ultimately access the contents in the classified secured file. According to one embodiment, referred to as a two-0pronged access scheme, a security clearance key is generated and assigned in accordance with a user's security access level. A security clearance key may range from most classified to non-classified. Depending on implementation, a security clearance key with a security level may be so configured that the key can be used to access secured files classified at or lower than the security level or multiple auxiliary keys are provided when a corresponding security clearance key is being requested. The auxiliary keys are those keys generated to facilitate access to secured files classified respectively less than the corresponding security or confidentiality level.

27 Claims, 10 Drawing Sheets

U.S. PATENT DOCUMENTS

| | | | |
|---|---|---|---|
| 4,734,568 A | 3/1988 | Watanabe | |
| 4,757,533 A | 7/1988 | Allen et al. | |
| 4,796,220 A | 1/1989 | Wolfe | |
| 4,799,258 A | 1/1989 | Davies | |
| 4,827,508 A | 5/1989 | Shear | |
| 4,887,204 A | 12/1989 | Johnson et al. | |
| 4,888,800 A | 12/1989 | Marshall et al. | |
| 4,912,552 A | 3/1990 | Allison et al. | |
| 4,972,472 A | 11/1990 | Brown et al. | |
| 5,032,979 A | 7/1991 | Hecht et al. | |
| 5,052,040 A | 9/1991 | Preston et al. | |
| 5,058,164 A | 10/1991 | Elmer et al. | |
| 5,144,660 A | 9/1992 | Rose | |
| 5,204,897 A | 4/1993 | Wyman | |
| 5,212,788 A | 5/1993 | Lomet et al. | |
| 5,220,657 A | 6/1993 | Bly et al. | |
| 5,235,641 A | 8/1993 | Nozawa et al. | |
| 5,247,575 A | 9/1993 | Sprague et al. | |
| 5,267,313 A | 11/1993 | Hirata | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,434,918 A | 7/1995 | Kung et al. | |
| 5,461,710 A | 10/1995 | Bloomfield et al. | |
| 5,467,342 A | 11/1995 | Logston et al. | |
| 5,495,533 A | 2/1996 | Linehan et al. | |
| 5,497,422 A | 3/1996 | Tysen et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,619,576 A | 4/1997 | Shaw | |
| 5,638,501 A | 6/1997 | Gough et al. | |
| 5,640,388 A | 6/1997 | Woodhead et al. | |
| 5,655,119 A | 8/1997 | Davy | |
| 5,661,668 A | 8/1997 | Yemini et al. | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,682,537 A | 10/1997 | Davies et al. | |
| 5,684,987 A | 11/1997 | Mamiya et al. | |
| 5,689,688 A | 11/1997 | Strong et al. | |
| 5,689,718 A | 11/1997 | Sakurai et al. | |
| 5,693,652 A | 12/1997 | Takase et al. | |
| 5,699,428 A | 12/1997 | McDonnal et al. | |
| 5,708,709 A | 1/1998 | Rose | |
| 5,715,314 A | 2/1998 | Payne et al. | |
| 5,715,403 A | 2/1998 | Stefik | |
| 5,717,755 A | 2/1998 | Shanton | |
| 5,719,941 A | 2/1998 | Swift et al. | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,745,750 A | 4/1998 | Porcaro | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,768,381 A | 6/1998 | Hawthorne | |
| 5,778,065 A | 7/1998 | Hauser et al. | |
| 5,778,350 A | 7/1998 | Adams et al. | |
| 5,781,711 A | 7/1998 | Austin et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,850,443 A | 12/1998 | Van Oorschot et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,912,754 A | 6/1999 | Koga et al. | |
| 5,922,073 A | 7/1999 | Shimada | |
| 5,933,498 A | 8/1999 | Schneck et al. | |
| 5,944,794 A | 8/1999 | Okamoto et al. | |
| 5,953,419 A | 9/1999 | Lohstroh et al. | |
| 5,968,177 A | 10/1999 | Batten-Carew et al. | |
| 5,970,502 A | 10/1999 | Salkewicz et al. | |
| 5,978,802 A | 11/1999 | Hurvig | |
| 5,987,440 A | 11/1999 | O'Neil et al. | |
| 5,991,879 A | 11/1999 | Still | |
| 5,999,907 A | 12/1999 | Donner | |
| 6,011,847 A | 1/2000 | Follendore, III | |
| 6,012,044 A | 1/2000 | Maggioncalda et al. | |
| 6,014,730 A | 1/2000 | Ohtsu | |
| 6,023,506 A | 2/2000 | Ote et al. | |
| 6,031,584 A | 2/2000 | Gray | |
| 6,032,216 A | 2/2000 | Schmuck et al. | |
| 6,035,404 A | 3/2000 | Zhao | |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,061,797 A | 5/2000 | Jade et al. | |
| 6,069,057 A | 5/2000 | Wu | |
| 6,069,957 A | 5/2000 | Richards | |
| 6,070,244 A | 5/2000 | Orchier et al. | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,148,338 A | 11/2000 | Lachelt et al. | |
| 6,158,010 A | 12/2000 | Moriconi et al. | |
| 6,161,139 A | 12/2000 | Win et al. | |
| 6,170,060 B1 | 1/2001 | Mott et al. | |
| 6,182,142 B1 | 1/2001 | Win et al. | |
| 6,185,612 B1 | 2/2001 | Jensen et al. | |
| 6,185,684 B1 * | 2/2001 | Pravetz et al. | ................ 713/182 |
| 6,192,408 B1 | 2/2001 | Vahalia et al. | |
| 6,199,070 B1 | 3/2001 | Polo-Wood et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,755 B1 | 6/2001 | Yemini et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,266,420 B1 | 7/2001 | Langford et al. | |
| 6,272,631 B1 | 8/2001 | Thomlinson et al. | |
| 6,272,632 B1 | 8/2001 | Carman et al. | |

| | | |
|---|---|---|
| 6,282,649 B1 * | 8/2001 | Lambert et al. ............... 713/167 |
| 6,289,450 B1 | 9/2001 | Pensak et al. |
| 6,289,458 B1 | 9/2001 | Garg et al. |
| 6,292,895 B1 | 9/2001 | Baltzley |
| 6,292,899 B1 | 9/2001 | McBride |
| 6,295,361 B1 | 9/2001 | Kadansky et al. |
| 6,299,069 B1 | 10/2001 | Shona |
| 6,301,614 B1 | 10/2001 | Najork et al. |
| 6,308,256 B1 | 10/2001 | Folmsbee |
| 6,308,273 B1 | 10/2001 | Goertzel et al. |
| 6,314,408 B1 | 11/2001 | Salas et al. |
| 6,314,409 B2 | 11/2001 | Schneck et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 * | 2/2002 | Mooney et al. ............... 713/185 |
| 6,353,859 B1 | 3/2002 | McKeehan et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,366,298 B1 | 4/2002 | Haitsuka et al. |
| 6,370,249 B1 | 4/2002 | Van Oorschot |
| 6,381,698 B1 | 4/2002 | Devanbu et al. |
| 6,385,644 B1 | 5/2002 | Devine et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,405,318 B1 | 6/2002 | Rowland |
| 6,408,404 B1 | 6/2002 | Ladwig |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,453,419 B1 | 9/2002 | Flint et al. |
| 6,466,476 B1 | 10/2002 | Wong et al. |
| 6,466,932 B1 | 10/2002 | Dennis et al. |
| 6,477,544 B1 | 11/2002 | Bolosky et al. |
| 6,487,662 B1 | 11/2002 | Kharon et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,574,733 B1 | 6/2003 | Langford |
| 6,584,466 B1 | 6/2003 | Serbinis et al. |
| 6,587,878 B1 | 7/2003 | Merriam |
| 6,587,946 B1 | 7/2003 | Jakobsson |
| 6,588,673 B1 | 7/2003 | Chan et al. |
| 6,591,295 B1 | 7/2003 | Diamond et al. |
| 6,594,662 B1 | 7/2003 | Sieffert et al. |
| 6,598,161 B1 | 7/2003 | Kluttz et al. |
| 6,601,170 B1 | 7/2003 | Wallace, Jr. |
| 6,603,857 B1 | 8/2003 | Batten-Carew et al. |
| 6,608,636 B1 | 8/2003 | Roseman |
| 6,609,115 B1 | 8/2003 | Mehring et al. |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,625,734 B1 | 9/2003 | Marvit et al. |
| 6,629,140 B1 | 9/2003 | Fertell et al. |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,683,954 B1 | 1/2004 | Searle et al. |
| 6,687,822 B1 | 2/2004 | Jakobsson |
| 6,693,652 B1 | 2/2004 | Barrus et al. |
| 6,698,022 B1 | 2/2004 | Wu |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,751,573 B1 | 6/2004 | Burch |
| 6,754,657 B2 | 6/2004 | Lomet |
| 6,754,665 B1 | 6/2004 | Futagami et al. |
| 6,775,779 B1 | 8/2004 | England et al. |
| 6,779,031 B1 | 8/2004 | Picher-Dempsey |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,969 B2 | 11/2004 | Miyazaki et al. |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,842,825 B2 | 1/2005 | Geiner et al. |
| 6,845,452 B1 | 1/2005 | Roddy et al. |
| 6,851,050 B2 | 2/2005 | Singhal et al. |
| 6,862,103 B1 | 3/2005 | Miura et al. |
| 6,865,555 B2 | 3/2005 | Novak |
| 6,870,920 B2 | 3/2005 | Henits |
| 6,874,139 B2 | 3/2005 | Krueger et al. |
| 6,877,010 B2 | 4/2005 | Smith-Semedo et al. |
| 6,877,136 B2 | 4/2005 | Bess et al. |
| 6,882,994 B2 | 4/2005 | Yoshimura et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,898,627 B1 | 5/2005 | Sekiguchi |
| 6,907,034 B1 | 6/2005 | Begis |
| 6,909,708 B1 | 6/2005 | Krishnaswamy et al. |
| 6,915,425 B2 | 7/2005 | Xu et al. |
| 6,915,434 B1 | 7/2005 | Kuroda et al. |
| 6,915,435 B1 | 7/2005 | Merriam |
| 6,920,558 B2 | 7/2005 | Sames et al. |
| 6,922,785 B1 | 7/2005 | Brewer et al. |
| 6,924,425 B2 | 8/2005 | Naples et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,938,156 B2 | 8/2005 | Wheeler et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,943 B1 | 9/2005 | Bacha et al. |
| 9,505,941 | 9/2005 | Lee et al. |
| 9,507,936 | 9/2005 | Subramaniam et al. |
| 6,952,780 B2 | 10/2005 | Olsen et al. |
| 6,954,753 B1 | 10/2005 | Jeran et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,961,855 B1 | 11/2005 | Rich et al. |
| 6,968,060 B1 | 11/2005 | Pinkas |
| 6,968,456 B1 | 11/2005 | Tripathi et al. |
| 6,971,018 B1 | 11/2005 | Witt et al. |
| 6,976,259 B1 | 12/2005 | Dutta et al. |
| 6,978,366 B1 | 12/2005 | Ignatchenko et al. |

| Patent No. | Date | Inventor |
|---|---|---|
| 6,978,376 B2 | 12/2005 | Giroux et al. |
| 6,978,377 B1 | 12/2005 | Asano et al. |
| 6,987,752 B1 | 1/2006 | Sarraf et al. |
| 6,988,133 B1 | 1/2006 | Zavalkovsky et al. |
| 6,988,199 B2 | 1/2006 | Toh et al. |
| 6,990,441 B1 | 1/2006 | Bolme et al. |
| 6,993,135 B1 | 1/2006 | Ishibashi |
| 6,996,718 B1 | 2/2006 | Henry et al. |
| 7,000,150 B1 | 2/2006 | Zunino et al. |
| 7,003,116 B2 | 2/2006 | Riedel et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,010,689 B1 | 3/2006 | Matyas et al. |
| 7,010,809 B2 | 3/2006 | Hori et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 | 5/2006 | Bolosky et al. |
| 7,046,807 B2 | 5/2006 | Hirano et al. |
| 7,047,404 B1 | 5/2006 | Doonan et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,062,642 B1 | 6/2006 | Langrind et al. |
| 7,073,063 B2 | 7/2006 | Peinado |
| 7,073,073 B1 | 7/2006 | Nonaka et al. |
| 7,076,063 B2 | 7/2006 | Kuroiwa |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Morishita |
| 7,096,266 B2 | 8/2006 | Lewin et al. |
| 7,099,926 B1 | 8/2006 | Ims et al. |
| 7,103,911 B2 | 9/2006 | Spies et al. |
| 7,107,185 B1 | 9/2006 | Yemini et al. |
| 7,107,269 B2 | 9/2006 | Arlein et al. |
| 7,107,416 B2 | 9/2006 | Stuart et al. |
| 7,113,594 B2 | 9/2006 | Boneh et al. |
| 7,116,785 B2 | 10/2006 | Okaue |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,126,957 B1 | 10/2006 | Isukapalli et al. |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,139,399 B1 | 11/2006 | Zimmermann |
| 7,140,044 B2 | 11/2006 | Redlich et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,165,179 B2 | 1/2007 | Maruyama et al. |
| 7,168,094 B1 | 1/2007 | Fredell |
| 7,171,557 B2 | 1/2007 | Kallahalla et al. |
| 7,174,563 B1 | 2/2007 | Brownlie et al. |
| 7,177,426 B1 | 2/2007 | Dube |
| 7,177,427 B1 | 2/2007 | Komuro et al. |
| 7,177,839 B1 | 2/2007 | Claxton et al. |
| 7,178,033 B1 | 2/2007 | Garcia |
| 7,181,017 B1 | 2/2007 | Nagel et al. |
| 7,185,196 B1 | 2/2007 | Kuskin et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,197,638 B1 | 3/2007 | Grawrock et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,249,251 B2 | 7/2007 | Todd et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,281,272 B1 | 10/2007 | Rubin et al. |
| 7,287,055 B2 | 10/2007 | Cannata et al. |
| 7,287,058 B2 | 10/2007 | Loveland et al. |
| 7,287,620 B2 | 10/2007 | Thomas et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,340,600 B1 | 3/2008 | Corella |
| 7,343,488 B2 | 3/2008 | Yadav |
| 7,359,517 B1 | 4/2008 | Rowe |
| 7,362,868 B2 | 4/2008 | Madoukh et al. |
| 7,380,120 B1 | 5/2008 | Garcia |
| 7,383,586 B2 | 6/2008 | Cross et al. |
| 7,386,529 B2 | 6/2008 | Kiessig et al. |
| 7,386,599 B1 | 6/2008 | Piersol et al. |
| 7,401,220 B2 | 7/2008 | Bolosky et al. |
| 7,406,596 B2 | 7/2008 | Tararukhin et al. |
| 7,415,608 B2 | 8/2008 | Bolosky et al. |
| 7,434,048 B1 | 10/2008 | Shapiro et al. |
| 7,454,612 B2 | 11/2008 | Bolosky et al. |
| 7,461,157 B2 | 12/2008 | Ahlard et al. |
| 7,461,405 B2 | 12/2008 | Boudreault et al. |
| 7,478,243 B2 | 1/2009 | Bolosky et al. |
| 7,478,418 B2 | 1/2009 | Supramaniam et al. |
| 7,484,245 B1 | 1/2009 | Friedman et al. |
| 7,496,959 B2 | 2/2009 | Adelstein et al. |
| 7,509,492 B2 | 3/2009 | Boyen et al. |
| 7,512,810 B1 | 3/2009 | Ryan |
| 7,526,657 B2 | 4/2009 | Saneto et al. |
| 7,539,867 B2 | 5/2009 | Bolosky et al. |
| 7,555,558 B1 | 6/2009 | Kenrich et al. |
| 7,562,232 B2 | 7/2009 | Zuili et al. |
| 7,565,683 B1 | 7/2009 | Huang et al. |
| 7,577,838 B1 | 8/2009 | Rossmann et al. |
| 7,631,184 B2 | 12/2009 | Ryan |
| 7,681,034 B1 | 3/2010 | Lee et al. |
| 7,698,230 B1 | 4/2010 | Brown et al. |
| 7,702,909 B2 | 4/2010 | Vainstein |
| 7,703,140 B2 | 4/2010 | Nath et al. |
| 7,707,427 B1 | 4/2010 | Kenrich et al. |
| 7,729,995 B1 | 6/2010 | Alain et al. |
| 7,730,543 B1 | 6/2010 | Nath et al. |
| 7,748,045 B2 | 6/2010 | Kenrich et al. |
| RE41,546 E | 8/2010 | Vainstein |
| 7,783,765 B2 | 8/2010 | Hildebrand et al. |
| 7,836,310 B1 | 11/2010 | Gutnik |
| 7,890,990 B1 | 2/2011 | Vainstein et al. |
| 7,913,311 B2 | 3/2011 | Alain et al. |
| 7,917,938 B2 | 3/2011 | Jacobson |
| 7,921,284 B1 | 4/2011 | Kinghorn et al. |
| 7,921,288 B1 | 4/2011 | Hildebrand |
| 7,921,450 B1 | 4/2011 | Vainstein et al. |
| 7,930,756 B1 | 4/2011 | Crocker et al. |
| 7,950,066 B1 | 5/2011 | Zuili |
| 8,006,280 B1 | 8/2011 | Hildebrand et al. |
| 8,065,713 B1 | 11/2011 | Vainstein et al. |
| 2001/0000265 A1 | 4/2001 | Schreiber et al. |
| 2001/0011254 A1 | 8/2001 | Clark |
| 2001/0014882 A1 | 8/2001 | Stefik et al. |
| 2001/0018743 A1 | 8/2001 | Morishita |
| 2001/0021255 A1 | 9/2001 | Ishibashi |
| 2001/0021926 A1 | 9/2001 | Schneck et al. |
| 2001/0023421 A1 | 9/2001 | Numao et al. |
| 2001/0032181 A1 | 10/2001 | Jakstadt et al. |
| 2001/0033611 A1 | 10/2001 | Grimwood et al. |
| 2001/0034839 A1 | 10/2001 | Karjoth et al. |
| 2001/0042110 A1 | 11/2001 | Furusawa et al. |

| | | |
|---|---|---|
| 2001/0044903 A1 | 11/2001 | Yamamoto et al. |
| 2001/0056541 A1 | 12/2001 | Matsuzaki et al. |
| 2001/0056550 A1 | 12/2001 | Lee |
| 2002/0003886 A1 | 1/2002 | Hillegass et al. |
| 2002/0007335 A1 | 1/2002 | Millard et al. |
| 2002/0010679 A1 | 1/2002 | Felsher |
| 2002/0013772 A1 | 1/2002 | Peinado |
| 2002/0016921 A1 | 2/2002 | Olsen et al. |
| 2002/0016922 A1 | 2/2002 | Richards et al. |
| 2002/0023208 A1 | 2/2002 | Jancula |
| 2002/0026321 A1 | 2/2002 | Faris et al. |
| 2002/0027886 A1 | 3/2002 | Fischer et al. |
| 2002/0029340 A1 | 3/2002 | Pensak et al. |
| 2002/0031230 A1 | 3/2002 | Sweet et al. |
| 2002/0035624 A1 | 3/2002 | Kim |
| 2002/0036984 A1 | 3/2002 | Chiussi et al. |
| 2002/0041391 A1 | 4/2002 | Bannai |
| 2002/0042756 A1 | 4/2002 | Kumar et al. |
| 2002/0046350 A1 | 4/2002 | Lordemann et al. |
| 2002/0050098 A1 | 5/2002 | Chan |
| 2002/0052981 A1 | 5/2002 | Yasuda |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0062451 A1 | 5/2002 | Scheidt et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0078239 A1 | 6/2002 | Howard et al. |
| 2002/0078361 A1 | 6/2002 | Giroux et al. |
| 2002/0087479 A1 | 7/2002 | Malcolm |
| 2002/0089602 A1 | 7/2002 | Sullivan |
| 2002/0091532 A1 | 7/2002 | Viets et al. |
| 2002/0091745 A1 | 7/2002 | Ramamurthy et al. |
| 2002/0091928 A1 | 7/2002 | Bouchard et al. |
| 2002/0093527 A1 | 7/2002 | Sherlock et al. |
| 2002/0099947 A1 | 7/2002 | Evans |
| 2002/0112035 A1 | 8/2002 | Carey et al. |
| 2002/0112048 A1 | 8/2002 | Gruyer et al. |
| 2002/0120851 A1 | 8/2002 | Clarke |
| 2002/0124180 A1 | 9/2002 | Hagman |
| 2002/0129158 A1 | 9/2002 | Zhang et al. |
| 2002/0129235 A1 | 9/2002 | Okamoto et al. |
| 2002/0133500 A1 | 9/2002 | Arlein et al. |
| 2002/0133699 A1 | 9/2002 | Pueschel |
| 2002/0138571 A1 | 9/2002 | Trinon et al. |
| 2002/0138726 A1 | 9/2002 | Sames et al. |
| 2002/0138762 A1 | 9/2002 | Horne |
| 2001/0150239 | 10/2002 | Carny et al. |
| 2002/0143710 A1 | 10/2002 | Liu |
| 2002/0143906 A1 | 10/2002 | Tormasov et al. |
| 2002/0147746 A1 | 10/2002 | Lee |
| 2002/0150239 A1 | 10/2002 | Carny et al. |
| 2002/0152302 A1 | 10/2002 | Motoyama et al. |
| 2002/0156726 A1 | 10/2002 | Kleckner et al. |
| 2002/0157016 A1 | 10/2002 | Russell et al. |
| 2002/0162104 A1 | 10/2002 | Raike et al. |
| 2002/0165870 A1 | 11/2002 | Chakraborty et al. |
| 2002/0166053 A1 | 11/2002 | Wilson |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174030 A1 | 11/2002 | Praisner et al. |
| 2002/0174109 A1 | 11/2002 | Chandy et al. |
| 2002/0174415 A1 | 11/2002 | Hines |
| 2002/0176572 A1 | 11/2002 | Ananth |
| 2002/0178271 A1 | 11/2002 | Graham et al. |
| 2002/0184217 A1 | 12/2002 | Bisbee et al. |
| 2002/0184488 A1 | 12/2002 | Amini et al. |
| 2002/0194484 A1 | 12/2002 | Bolosky et al. |
| 2002/0198798 A1 | 12/2002 | Ludwig et al. |
| 2003/0005168 A1 | 1/2003 | Leerssen et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0026431 A1 | 2/2003 | Hammersmith |
| 2003/0028610 A1 | 2/2003 | Pearson |
| 2003/0033528 A1 | 2/2003 | Ozog et al. |
| 2003/0037029 A1 | 2/2003 | Holenstein et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046176 A1 | 3/2003 | Hynes |
| 2003/0046238 A1 | 3/2003 | Nonaka et al. |
| 2003/0046270 A1 | 3/2003 | Leung et al. |
| 2003/0050919 A1 | 3/2003 | Brown et al. |
| 2003/0051039 A1 | 3/2003 | Brown et al. |
| 2003/0056139 A1 | 3/2003 | Murray et al. |
| 2003/0061482 A1 | 3/2003 | Emmerichs |
| 2003/0061506 A1 | 3/2003 | Cooper et al. |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081785 A1 | 5/2003 | Boneh et al. |
| 2003/0081787 A1 | 5/2003 | Kallahalla et al. |
| 2003/0081790 A1 | 5/2003 | Kallahalla et al. |
| 2003/0088517 A1 | 5/2003 | Medoff |
| 2003/0088783 A1 | 5/2003 | DiPierro |
| 2003/0093457 A1 | 5/2003 | Goldick |
| 2003/0095552 A1 | 5/2003 | Bernhard et al. |
| 2003/0099248 A1 | 5/2003 | Speciner |
| 2003/0101072 A1 | 5/2003 | Dick et al. |
| 2003/0108883 A1 | 6/2003 | Rondinone |
| 2003/0110131 A1 | 6/2003 | Alain et al. |
| 2003/0110169 A1 | 6/2003 | Zuili |
| 2003/0110266 A1 | 6/2003 | Rollins et al. |
| 2003/0110280 A1 | 6/2003 | Hinchliffe et al. |
| 2003/0110397 A1 | 6/2003 | Supramaniam et al. |
| 2003/0115146 A1 | 6/2003 | Lee et al. |
| 2003/0115218 A1 | 6/2003 | Bobbitt et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0132949 A1 | 7/2003 | Fallon et al. |
| 2003/0154296 A1 | 8/2003 | Noguchi et al. |
| 2003/0154381 A1 | 8/2003 | Ouye |
| 2003/0154396 A1 | 8/2003 | Godwin et al. |
| 2003/0154401 A1 | 8/2003 | Hartman et al. |
| 2003/0159048 A1 | 8/2003 | Matsumoto et al. |
| 2003/0159066 A1 | 8/2003 | Staw et al. |
| 2003/0163704 A1 | 8/2003 | Dick et al. |
| 2003/0165117 A1 | 9/2003 | Garcia-Luna-Aceves et al. |
| 2003/0172280 A1 | 9/2003 | Scheidt et al. |
| 2003/0177070 A1 | 9/2003 | Viswanath et al. |
| 2003/0177378 A1 | 9/2003 | Wittkotter |
| 2003/0182310 A1 | 9/2003 | Charnock et al. |
| 2003/0182579 A1 | 9/2003 | Leporini et al. |
| 2003/0182584 A1 | 9/2003 | Banes et al. |
| 2003/0191938 A1 | 10/2003 | Woods et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0204692 A1 | 10/2003 | Tamer et al. |
| 2003/0208485 A1 | 11/2003 | Castellanos |
| 2003/0217264 A1 | 11/2003 | Martin et al. |
| 2003/0217281 A1 | 11/2003 | Ryan |
| 2003/0217282 A1 | 11/2003 | Henry |
| 2003/0217333 A1 | 11/2003 | Smith et al. |
| 2003/0220999 A1 | 11/2003 | Emerson |
| 2003/0222141 A1 | 12/2003 | Vogler et al. |
| 2003/0226013 A1 | 12/2003 | Dutertre |
| 2003/0229795 A1 | 12/2003 | Kunigkeit et al. |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0041845 A1 | 3/2004 | Alben et al. |
| 2004/0049702 A1 | 3/2004 | Subramaniam et al. |
| 2004/0064507 A1 | 4/2004 | Sakata et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 | 4/2004 | Toomey |

| | | | |
|---|---|---|---|
| 2004/0073718 A1 | 4/2004 | Johannessen et al. | |
| 2004/0088548 A1 | 5/2004 | Smetters et al. | |
| 2004/0098580 A1 | 5/2004 | DeTreville | |
| 2004/0103202 A1 | 5/2004 | Hildebrand et al. | |
| 2004/0103280 A1 | 5/2004 | Balfanz et al. | |
| 2004/0117371 A1 | 6/2004 | Bhide et al. | |
| 2004/0131191 A1 | 7/2004 | Chen et al. | |
| 2004/0133544 A1 | 7/2004 | Kiessig et al. | |
| 2004/0158586 A1 | 8/2004 | Tsai | |
| 2004/0186845 A1 | 9/2004 | Fukui | |
| 2004/0193602 A1 | 9/2004 | Liu et al. | |
| 2004/0193905 A1 | 9/2004 | Lirov et al. | |
| 2004/0193912 A1 | 9/2004 | Li et al. | |
| 2004/0199514 A1 | 10/2004 | Rosenblatt et al. | |
| 2004/0205576 A1 | 10/2004 | Chikirivao et al. | |
| 2004/0215956 A1 | 10/2004 | Venkatachary et al. | |
| 2004/0215962 A1 | 10/2004 | Douceur et al. | |
| 2004/0243853 A1 | 12/2004 | Swander et al. | |
| 2004/0254884 A1 | 12/2004 | Haber et al. | |
| 2005/0021467 A1 | 1/2005 | Franzdonk | |
| 2005/0021629 A1 | 1/2005 | Cannata et al. | |
| 2005/0028006 A1 | 2/2005 | Leser et al. | |
| 2005/0039034 A1 | 2/2005 | Doyle et al. | |
| 2005/0050098 A1 | 3/2005 | Barnett | |
| 2005/0071275 A1 | 3/2005 | Vainstein et al. | |
| 2005/0071657 A1 | 3/2005 | Ryan | |
| 2005/0071658 A1 | 3/2005 | Nath et al. | |
| 2005/0081029 A1 | 4/2005 | Thornton et al. | |
| 2005/0086531 A1 | 4/2005 | Kenrich | |
| 2005/0091289 A1 | 4/2005 | Shappell et al. | |
| 2005/0091484 A1 | 4/2005 | Thornton et al. | |
| 2005/0097061 A1 | 5/2005 | Shapiro et al. | |
| 2005/0120199 A1 | 6/2005 | Carter | |
| 2005/0138371 A1 | 6/2005 | Supramaniam | |
| 2005/0138383 A1 | 6/2005 | Vainstein | |
| 2005/0168766 A1 | 8/2005 | Troyansky et al. | |
| 2005/0177716 A1 | 8/2005 | Ginter et al. | |
| 2005/0177858 A1 | 8/2005 | Ueda | |
| 2005/0193397 A1 | 9/2005 | Corenthin et al. | |
| 2005/0198326 A1 | 9/2005 | Schlimmer et al. | |
| 2005/0223242 A1 | 10/2005 | Nath | |
| 2005/0223414 A1 | 10/2005 | Kenrich et al. | |
| 2005/0235154 A1 | 10/2005 | Serret-Avila | |
| 2005/0256909 A1 | 11/2005 | Aboulhosn et al. | |
| 2005/0268033 A1 | 12/2005 | Ogasawara et al. | |
| 2005/0273600 A1 | 12/2005 | Seeman | |
| 2005/0283610 A1 | 12/2005 | Serret-Avila et al. | |
| 2005/0288961 A1 | 12/2005 | Tabrizi | |
| 2006/0005021 A1 | 1/2006 | Torrubia-Saez | |
| 2006/0011400 A1 | 1/2006 | Thomas | |
| 2006/0075258 A1 | 4/2006 | Adamson et al. | |
| 2006/0075465 A1 | 4/2006 | Ramanathan et al. | |
| 2006/0093150 A1 | 5/2006 | Reddy et al. | |
| 2006/0101285 A1 | 5/2006 | Chen et al. | |
| 2006/0149407 A1 | 7/2006 | Markham et al. | |
| 2006/0168147 A1 | 7/2006 | Inoue et al. | |
| 2006/0184637 A1 | 8/2006 | Hultgren et al. | |
| 2006/0230437 A1 | 10/2006 | Boyer et al. | |
| 2006/0277316 A1 | 12/2006 | Wang et al. | |
| 2007/0006214 A1 | 1/2007 | Dubal et al. | |
| 2007/0067837 A1 | 3/2007 | Schuster | |
| 2007/0083575 A1 | 4/2007 | Leung et al. | |
| 2007/0192478 A1 | 8/2007 | Louie et al. | |
| 2007/0193397 A1 | 8/2007 | Hwan | |
| 2007/0294368 A1 | 12/2007 | Bomgaars et al. | |
| 2008/0034205 A1 | 2/2008 | Alain et al. | |
| 2008/0075126 A1 | 3/2008 | Yang | |
| 2009/0100268 A1 | 4/2009 | Garcia et al. | |
| 2009/0254843 A1 | 10/2009 | Van Wie et al. | |
| 2009/0254972 A1 | 10/2009 | Huang et al. | |
| 2010/0047757 A1 | 2/2010 | McCurry et al. | |
| 2010/0199088 A1 | 8/2010 | Nath | |
| 2011/0258438 A1 | 10/2011 | Hildebrand | |
| 2011/0307937 A1 | 12/2011 | Hildebrand et al. | |
| 2012/0137130 A1 | 5/2012 | Vainstein et al. | |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 A2 | 6/2001 |
| EP | 1 107 504 B1 | 6/2001 |
| EP | 1 130 492 A2 | 9/2001 |
| EP | 1 154 348 A1 | 11/2001 |
| EP | 1 320 012 A2 | 6/2003 |
| EP | 1 324 565 A1 | 7/2003 |
| GB | 2 328 047 A | 2/1999 |
| GB | 2001-036517 A | 2/2001 |
| JP | 2006-244044 A | 9/2006 |
| JP | 2009-020720 A | 1/2009 |
| WO | WO 96/41288 A1 | 12/1996 |
| WO | WO 00/56028 A2 | 9/2000 |
| WO | WO 01/61438 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |
| WO | WO 01/63387 A2 | 8/2007 |

OTHER PUBLICATIONS

Adobe Acrobat Security Settings, Acrobat 7.0, Nov. 15, 2004, pp. 1-4.

"Affect," The American Heritage Dictionary of the English Language, Fourth Edition, Houghton Mifflin Company, 2002. Retrieved May 4, 2006 from http://dictionary.reference.com/search?q=affect.

Boneh et al., "Hierarchical Identity Based Encryption with Constant Size Ciphertext," Advances in Cryptology—EUROCRYPT 2005, vol. 3943, Jun. 20, 2005, pp. 440-456.

Boneh et al., "IBE Secure E-mail," Stanford University, Apr. 8, 2002, http://crypto.stanford.edu/ibe/.

Botha et al., "Access Control in Document-Centric Workflow Systems—An Agent-Based Approach," Computers & Society, vol. 20:6, Sep. 2001, pp. 525-532.

Botha et al., "Separation of Duties for Access Control Enforcement in Workflow Environments," IBM, 2001.

"Columns," Microsoft TechNet http://web.archive.org/web/20021014225142/www.microsoft.com/techneUcolumns/default.asp Oct. 14, 2002, Retrieved from web.archive.org on Dec. 3, 2009.

"Column Archives," Microsoft TechNet, Professor Windows, technet.microsoft.com/menus/library/bb878075.aspx, retrieved on Dec. 3, 2009, 3 pages.

Curtis, et al., "Securing the Global, Remote, Mobile User," 1999 John Wiley & Sons, Ltd., Int. J. Network Mgmt. 9, pp. 9-21.

"Encrypting File System," from MSDN Oct. 2001 version, exact publication date is unknown but believed prior to Dec. 12, 2001.

English language abstract for Japanese Appl. No. 2001-036517, filed Feb. 9, 2001, 1 pg.

English language translation (unverified, machine-generated) of Japanese Patent Publication No. JP 2006-244044, Japanese Patent Office, Patent & Utility Model Gazette DB, 2006.

English language translation (unverified, machine-generated) of Japanese Patent Publication No. 2009-020720, Japanese Patent Office, Patent & Utility Model Gazette DB, 2009.

Examination Report, completion date Jun. 18, 2008, for European Patent Application No. EP 02 258 532.7-1244, 6 pgs.

"eXPeriencing Remote Assistance" Microsoft TechNet—Professor Windows Oct. 2002 Oct. 15, 2002 http://web.archive.org/web/20021015165237/www.microsoft.com/techneUcolumns/profwin/, Retrieved from web.archive.org on Dec. 3, 2009.

Expiration Mechanism for Chipcards, IBM Technical Disclosure Bulletin, Oct. 1, 2001, UK.

"Features of EFS" from MSDN Oct. 2001 version, exact publication date is unknown but believed prior to Dec. 12, 2001.

"How EFS works," from MSDN Oct. 2001 version, exact publication date is unknown but believed prior to Dec. 12, 2001.

"Inside Encrypting file system," Part 1, from MSDN Oct. 2001 version, exact publication date is unknown but believed prior to Dec. 12, 2001.

"Inside Encrypting file system," Part 2, from MSDN Oct. 2001 version, exact publication date is unknown but believed prior to Dec. 12, 2001.
Juvva et al., "A Real-Time Push-Pull Communications Model for Distributed Real-Time and Multimedia Systems," CMU-CS-99-107, School of Computer Sciences, Carnegie Mellon University, Pittsburgh, PA, Jan. 1999, 25 pages.
McDaniel et al. "AntigonE: A Flexible Framework for Secure Group Communication," Proceedings of the 8th USENIX Security Symposium, Aug. 23, 1999.
Microsoft Press Computer Dictionary, 1997, Microsoft Press, Third Edition, p. 426.
Microsoft Windows 2000 server. Windows 2000 Group Policy White Paper, 2000, 137 pages.
"Migrating Accounts From Windows NT 4.0 Domains to Windows 2000," Microsoft TechNet—Professor Windows Apr. 2002, http://web.archive.org/web/20020415004611/www.m icrosoft.com/technetlcolumns/profwin/, Apr. 15, 2002.
Office Action, dated May 10, 2005, for European Patent Application No. 02258532.7, 5 pages.
Office Action, dated Oct. 5, 2005, for European Patent Application No. 02258522.7, European Patent Office, 5 pages.
Office Action, dated Dec. 5, 2006, for European Patent Application No. 02258532.7, European Patent Office, 5 pags.
Search Report, completion date Apr. 14, 2005, for European Patent Application No. Ep 02 25 8533, 2 pages.
Search Report, completion date Jul. 6, 2005, for European Patent Application No. EP 02 25 8529, 4 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, competion date May 12, 2005, for European Patent Application No. EP 02 25 8539, 2 pages.
Search Report, completion date May 8, 2003, for European Patent Application No. EP 02 25 8530, 2 pages.
Search Report, completion date May 8,2003, for European Patent Application No. EP 02 25 8540, 2 pages.
Search Report, completion date Oct.2, 2003, for European Patent Application No. EP 02 25 8531, 2 pages.
Search Report, completion date Oct. 8, 2003, for European Patent Application No. EP 02 25 8536, 2 pages.
"Scripting Your windows 2000 Network, Part 1" Microsoft TechNet—Professor Windows Jun. 2002, http://web.archive.org/web/20020622055532/www.microsoft.com/techneUcolumns/porfwin/ Retrieved from web.archive.org on Dec. 3, 2009.
"Secure Sockets Layer (SSL): How it Works," Verisign, http://www.verisign.com/ssl/ssl-information-center/how-ssl-security-works, pp. 1-2.
"Security Options", DC & Co., Dec. 20, 2001, pp. 1-2.
"Security with Encrypting File System," from MSDN Oct. 2002 version, exact publication date is unknown but believed prior to Dec. 12, 2001.
Stallings, William, "Cryptography and Network Security: Principles and Practice," 1999, pp. 333-337, Second Edition, Prentice Hall, Upper Saddle River, New Jersey.
Symantec, Norton Antivirus Corporate Edition Implementation Guide, 1999.
"Way Back Machine" web.archive.org, http://web.archive.org/web/*/http://www.microsoft.com/technetlcolumns/profwin/, Retrieved on Dec. 3, 2009.
"Windows 2000 EFS", Windows NT magazine, Apr. 1999.
Boneh, D., et al., "Identity-Based Encryption from the Weil Pairing", CRYPTO'01 Proceedings of the 21st Annual International Cryptology Conference on Advances in Cryptogology, Springer-Verlag London, UK, Oct. 2001, 27 pages.
Office ACtion, dated May 12, 2006, for European Patent Application No. 02258532.7, European Patent Office, 5 pages.
U.S. App. No. 10/074,825, entitled "Method and Apparatus for Accessing Secured Electronic Data Off-line," Lee et al., Feb. 12, 2002, 108 pages.
U.S. Appl. No. 10/206,737, entitled "Method and System for Updating Keys in a Distributed Security System" (now abandoned), Hildebrand, Jul. 26, 2002, 60 pgs.
U.S. Appl. No. 10/259,075, entitled "Effectuating Access Policy Changes to Designated Places for Secured Files," Crocker, Sep. 27, 2002, 60 pgs.
U.S. Appl. No. 10/286,575, entitled "Method and ARchitecture for Providing Access to SEcured Date from Non-Secured Clients," Vainstein, Nov. 1, 2002, 46 pgs.
U.S. Appl. No. 10/325,102, entitled "Method and apparatus for securing/unsecuring files by file crawling," Prakash, Dec. 20, 2002.
U.S. Appl. No. 60/475,109, "Method for Enforcing and Managing Usage Rights of Digital Data Objects in Dynamic, Distributed and Collaborative Contexts", Leser et al., filed Jun. 2, 2003, 55 pages.
U.S. Appl. No. 10/405,587, entitled "Method and system for securing digital assets using content type designations," Nath, Apr. 1, 2003.
U.S. Appl. No. 10/448,806, entitled "Method and System for Using Remote Headers to Secure Electronic Files," Ryan, May 30, 2003, 35 pgs.
U.S. Appl. No. 12/331,083, entitled "Method and Apparatus for Securing Digital Assets," Garcia, Dec. 9, 2008, 32 pages.

* cited by examiner

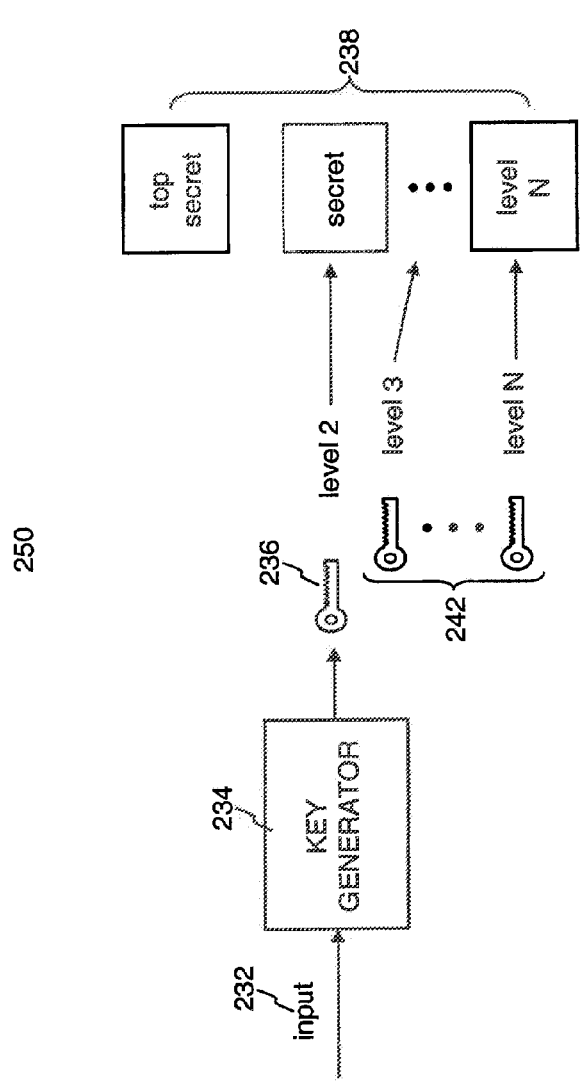

*Fig. 3B*

```
Header (Version 1)
<header version="1.0" document_uuid="..."> 
  <key_block_list version="1.0">
    <key_block version="1.0" group_uuid="..."> 
      <key_block version="1.0" group_uuid="..."> 
        <document_encryption_key key_key_pair_uuid="..."> 
        ... (Encrypted protection key)
        </document_encryption_key_key>
      </key_block>
      ... (more blocks if necessary)
  </key_block_list>
  <document_crypto_info version="...">
    <document_crypto version="1.0">
      <enc_doc_key>... (Encrypted document-encryption-key)
      </enc_doc_key>
      <enc_doc_level>... (String like "Secret" or "Top Secret" or "None")
      </enc_doc_level>
      <encryption_algorithm name="..." key_size="..." block_size="..." />
      <ses_block_size>... (size of encryption size)
      </ses_block_size>
    </document_crypto>
  </document_crypto_info>
  <enc_document_information>
    <document_information version="1.0">
      <creation_creator_uuid="..." date="..." />
      <last_modification_modifier_uuid="..." date="..." />
      <rule_set>... (details omitted)
      </rule_set>
    </document_information>
  </enc_document_information>
</header>
<header_MAC version="..."> ... (See Header MAC Information)
</header_MAC>
```

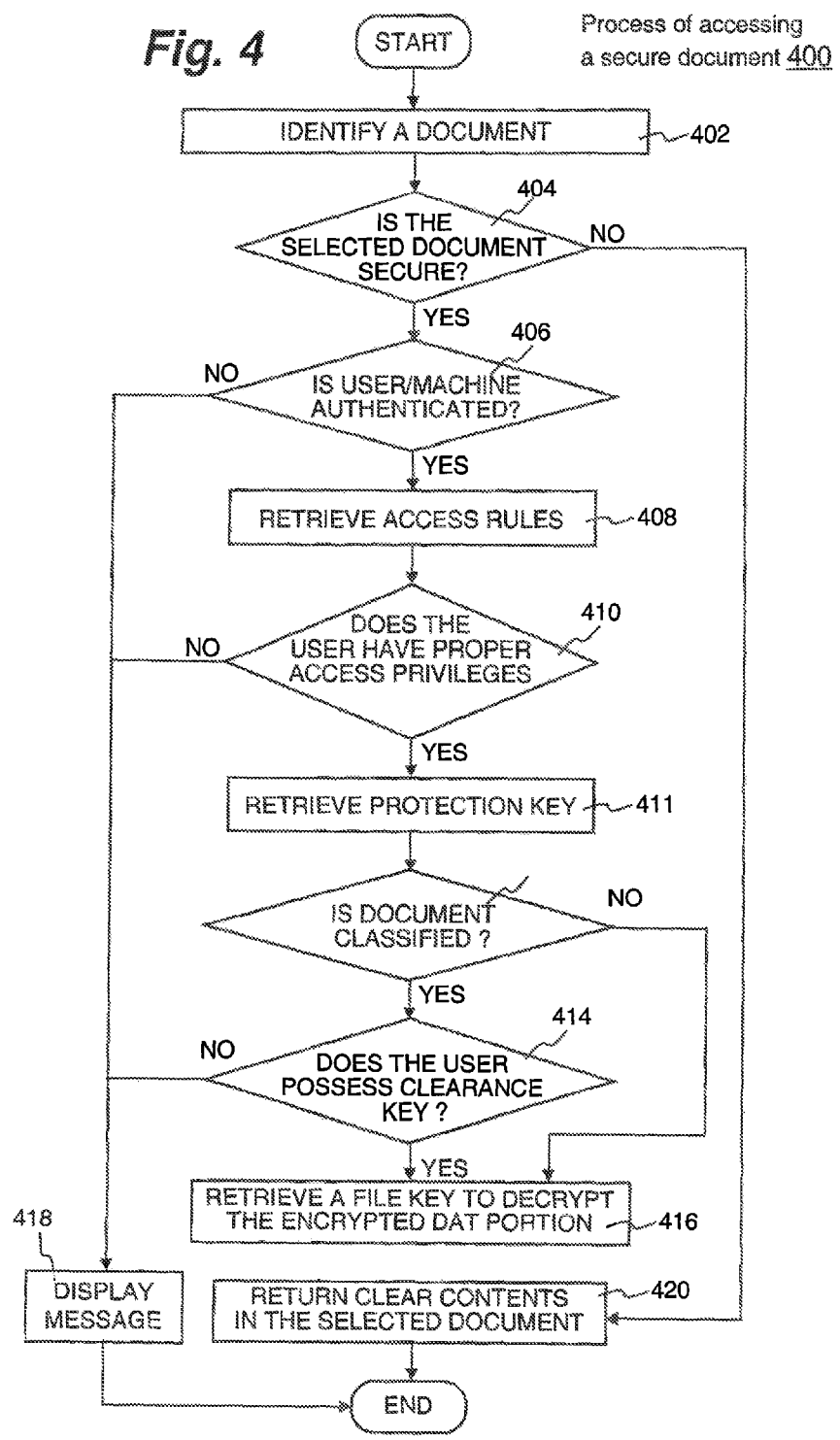

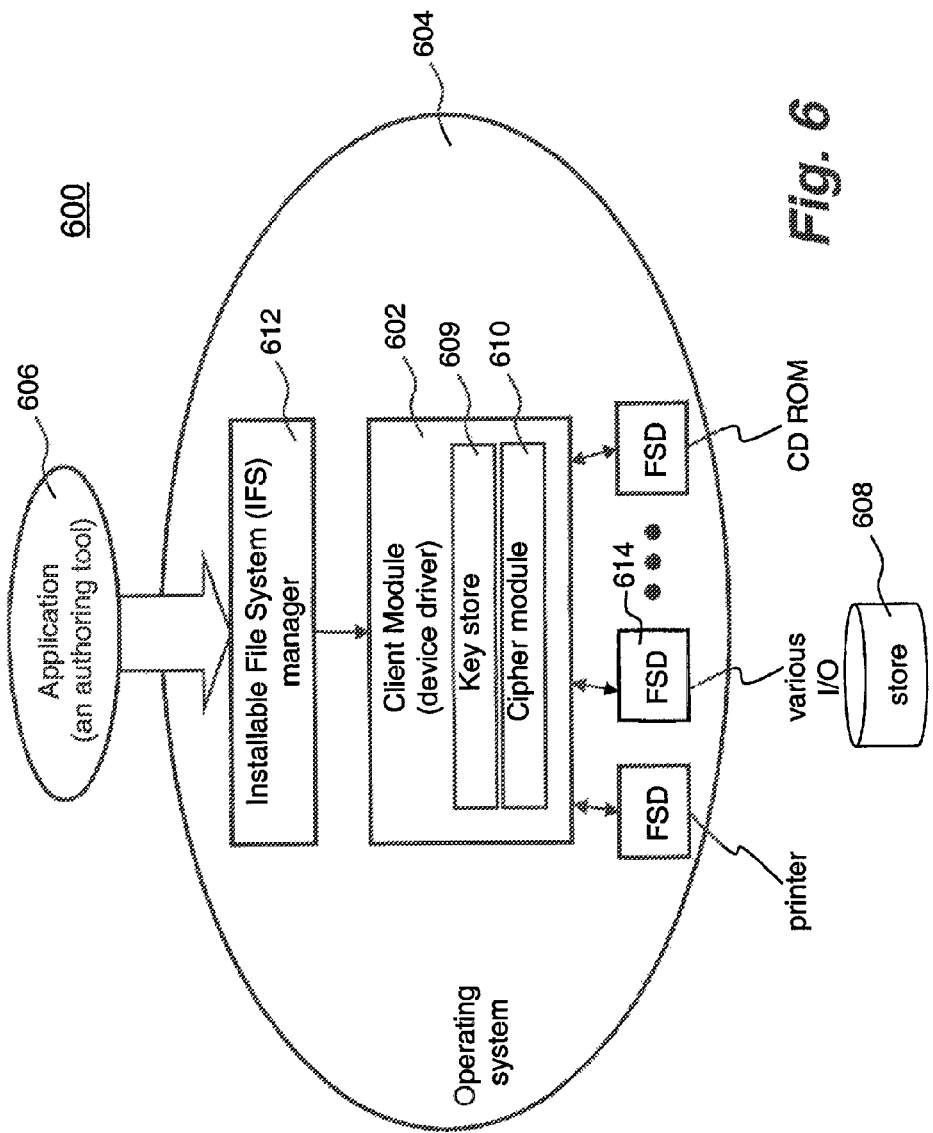

METHOD AND SYSTEM FOR PROTECTING ELECTRONIC DATA IN ENTERPRISE ENVIRONMENT

CROSS-REFERENCE TO RELATED APPLICATION

This application is a continuation of U.S. patent application Ser. No. 10/159,220, filed May 31, 2002, issued as U.S. Pat. No. 7,921,284 on Apr. 5, 2011, which is a continuation-in-part of U.S. patent application Ser. No. 10/074,804, filed Feb. 12, 2002, issued as U.S. Pat. No. 7,380,120 on May 27, 2008, and entitled "Secured Data Format for Access Control," which are hereby incorporated by reference for all purposes. This application also claims the benefits of U.S. Provisional Application No. 60/339,634, filed Dec. 12, 2001, and entitled "PERVASIVE SECURITY SYSTEMS," which is hereby incorporated by reference for all purposes. This application is also related to U.S. patent application Ser. No. 10/127,109 and entitled "Evaluation of Access Rights to Secured Digital Assets", which is hereby incorporated by reference.

BACKGROUND OF THE INVENTION

1. Field of the Invention

The present invention relates to the area of protecting data in an enterprise environment, and more particularly, relates to method, apparatus, software products and systems for securing digital assets (e.g. electronic data) in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an insecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remains available and vulnerable to improper access and usage by unauthorized users within or outside a supposedly protected perimeter.

A governmental report from General Accounting Office (GAO) details "significant and pervasive computer security weaknesses at seven organizations within the U.S. Department of Commerce, the widespread computer security weaknesses throughout the organizations have seriously jeopardized the integrity of some of the agency's most sensitive systems." Further it states: using readily available software and common techniques, we demonstrated the ability to penetrate sensitive Commerce systems from both inside Commerce and remotely, such as through the Internet," and "Individuals, both within and outside Commerce, could gain unauthorized access to these systems and read, copy, modify, and delete sensitive economic, financial, personnel, and confidential business data . . . " The report further concludes "[i]ntruders could disrupt the operations of systems that are critical to the mission of the department."

In fact, many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary Information residing on private networks. For example, depending on passwords to access sensitive documents from within often causes security breaches when the password of a few characters long is leaked or detected. Therefore, there is a need to provide more effective ways to secure and protect digital assets at all times.

SUMMARY OF INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to processes, systems, architectures and software products for providing pervasive security to digital assets at all times and is particularly suitable in an inter/intra enterprise environment. In general, pervasive security means that digital assets are secured at all times and can only be accessed by authenticated users with appropriate access rights or privileges, wherein the digital assets may include, but not be limited to, various types of documents, multimedia files, data, executable code, images and texts. According to one aspect of the present invention, the digital assets are in a secured form that only those with granted access rights can access. Even with the proper access privilege, when a secured file is classified, at least a security clearance key is needed to ensure those who have the right security clearance can ultimately access the contents in the classified secured file.

In another aspect of the present invention, the format of the secured file is so designed that the security information stays with the file being secured at all times or at least readily retrievable. According to one embodiment, a secured file or secured document includes two parts: an attachment referred to as a header, and an encrypted document or data portion. The header includes security information that points to or Includes access rules, a protection key and a file key. The access rules facilitate restrictive access to the encrypted data portion and essentially determine who/how and/or when/where the secured document can be accessed. The file key is used to encrypt/decrypt the encrypted data portion and protected by the protection key. If the contents in the secured file are classified, the file key is jointly protected by the protection key as well as a security clearance key associated with a user attempting to access the secured file. As a result, only those who have the proper access privileges are permitted to obtain the protection key, jointly with the security clearance key, to retrieve the file key to encrypt the encrypted data portion.

In still another aspect of the present invention, the security clearance key is generated and assigned in accordance with a user's security access level. A security clearance key may range from most classified to non-classified. If a user has the need to access a secured file classified with a certain security or confidential level, a corresponding security clearance key with that security level is assigned therefor. In one embodiment, a security clearance key with a security level is so configured that the key can be used to access secured files classified at or lower than the security level. As a result, a user needs to have only one security clearance key. In still another aspect of the present invention, multiple auxiliary keys are provided when a corresponding security Clearance key is being requested. The security clearance key is the one being requested, generated in accordance with the determined security level and can be used to facilitate the access to a secured file classified at a corresponding security or confidentiality level. The auxiliary keys are those keys generated to facilitate access to secured files classified respectively less than the corresponding security or confidentiality level.

Depending on implementation and application, the present invention may be implemented or employed in a client machine and a server machine. Typically, if a user's access privilege (i.e., access rights) to a secured file is locally determined in a client machine, the present invention may be implemented as an executable module configured to operate locally, preferably, in an operating system running in the client machine. If a user's access right to a secured file is remotely determined in a server machine, the present invention may be implemented as an executable module configured to operate in the server machine as well as in the client machine.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2D shows a diagram of generating a clearance key according to another embodiment of the present invention;

FIG. 3B shows an exemplary header structure of a secured file according to one embodiment of the present invention;

FIG. 6 shows an exemplary implementation of the present invention.

DETAILED DESCRIPTION OF THE PREFERRED EMBODIMENTS

Figure 1:
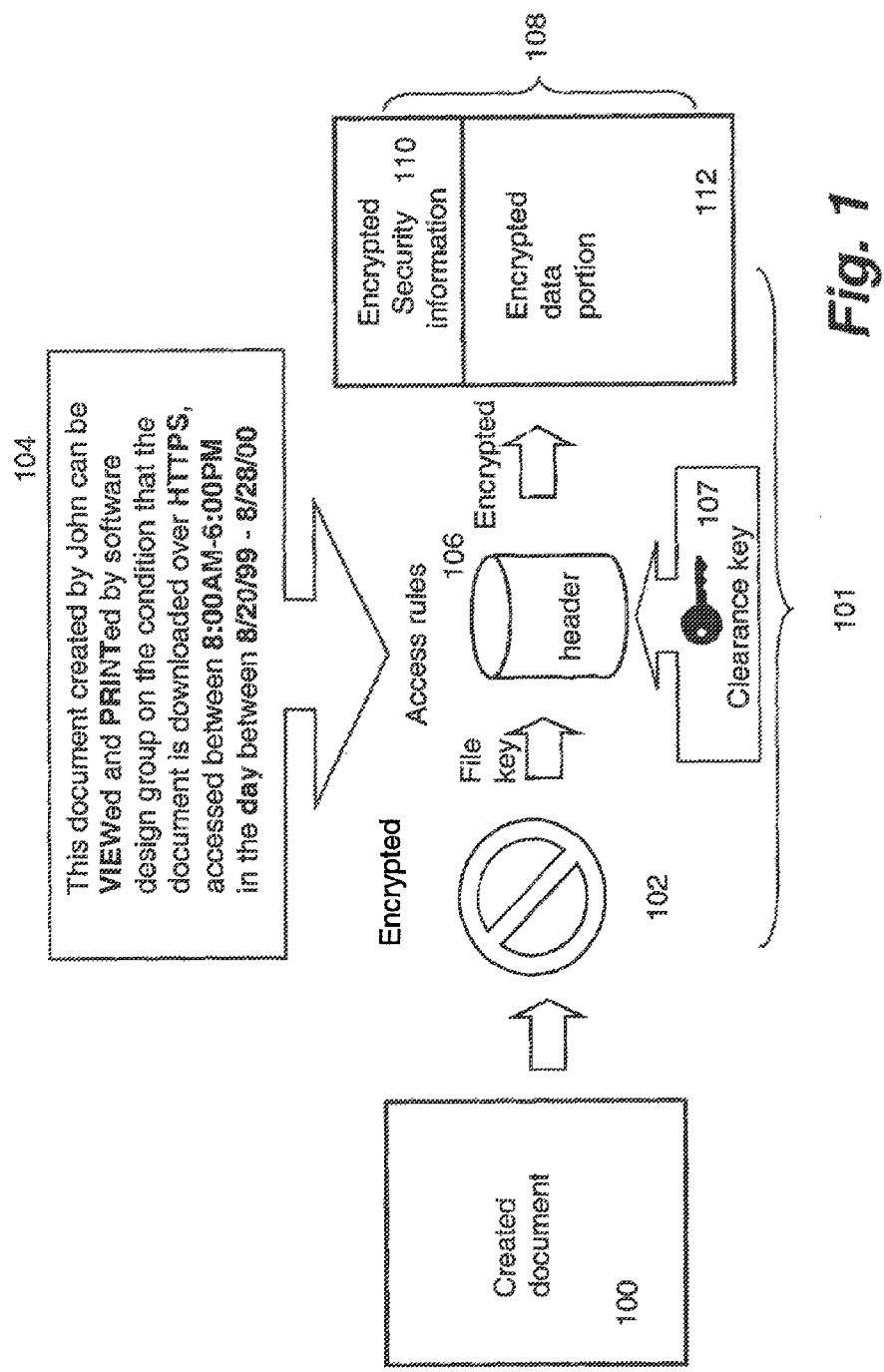
FIG. 1 shows a diagram of securing a created document according to one exemplary secured file form used in the present invention.

The present invention pertains to a process, a system, a method and a software product for securing electronic data or digital assets. According to one aspect of the present invention, secured files may be classified in several hierarchical security levels. To access the secured classified files, in addition to a user key, a user is assigned a clearance key that is based on at least two complementary concepts, "Need to Know" and "Sensitivity level" of the information in a secured classified file. According to another aspect of the present invention, the digital assets are in a form that includes two parts, one being an encrypted data portion and the other being a header including security information controlling restrictive access to the encrypted data portion. The security information employs access rules together with various cipher keys to ensure that only those with proper access privilege or rights can access the encrypted data portion.

There are numerous advantageous, benefits, and features in the present invention. One of them is the mechanism contemplated herein capable of providing pervasive security to digital assets sought to be protected at all times. Another one is that the digital assets are presented in such a way that only those with proper access privilege as well as sufficient security clearance level can access information in the digital assets. Other advantageous, benefits, and features in the present invention can be readily appreciated by those skilled in the art from the detailed description of the invention provided herein.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-6. However, those skilled in the art will readily appreciate that the detailed description given herein with respect to these figures is for explanatory purposes as the invention extends beyond these limited embodiments.

Generally, a content created by a creator for the purpose of an entity is an intellectual property belonging to the creator or the entity. In an enterprise, any kind of information or intellectual property can be content, though it is commonly referred to as "information" instead of "content". In either case, content or information is independent of its format, it may be in a printout or an electronic document. As used herein, content or information exists in a type of electronic data that is also referred to as a digital asset. A representation of the electronic data may include, but not be limited to, various types of documents, multimedia files, streaming data, dynamic or static data, executable code, images and texts.

To prevent contents in electronic data from an unauthorized access, the electronic data is typically stored in a form that is as close to impossible as possible to read without a priori knowledge. Its purpose is to ensure privacy by keeping the content hidden from anyone for whom it is not intended, even those who have access to the electronic data. Example of a priori knowledge may include, but not be limited to, a password, a secret phrase, biometric information or one or more keys.

FIG. 1 shows an illustration diagram of securing a created document 100 according to one embodiment of the present invention. One of the purposes of creating a secured file 108 is to ensure that the contents in the document 100 can be only accessed by or revealed to an authorized user with proper access privilege. As used herein, the user may mean a human user, a software agent, a group of users or a member thereof, a device and/or application(s). Besides a human user who needs to access a secured document, a software application or agent sometimes needs to access the secured document in order to proceed forward. Accordingly, unless specifically stated, the "user" as used herein does not necessarily pertain to a human being.

After the document 100 is created, edited or opened with an application or authoring tool (e.g., Microsoft WORD), upon an activation of a command, such as "Save," "Save As" or "Close", or automatic saving invoked by an operating system, the application itself, or an approved application, the created document 100 is caused to undergo a securing process 101. The securing process 101 starts with an encryption process 102, namely the document 100 that has been created or is being written into a store is encrypted by a cipher (e.g., an encryption process) with a file key (i.e., a cipher key). In other words, the encrypted data portion 112 could not be opened without the file key. For the purpose of controlling the access to the contents in the document 100 or the resultant secured file 108, the file key or keys may be the same or different keys for encryption and decryption and are included as part of security information contained in or pointed to by a header 106. The file key or keys, once obtained, can be used to decrypt the encrypted data portion 112 to reveal the contents therein.

To ensure that only authorized users or members of an authorized group can access the secured file 108, a set of access rules 104 for the document 100 is received or created and associated with the header 106. In general, the access rules 104 determine or regulate who and/or how the document 100, once secured, can be accessed. In some cases, the access rules 104 also determine or regulate when or where the document 100 can be accessed. In addition, security clearance information 107 is added to the header 106 if the secured file 108 is classified. In general, the security clearance information 107 is used to determine a level of access privilege or security level of a user who is attempting to access the contents in the secured file 108. For example, a secured file may be classified as "Top secret", "Secret", "Confidential", and "Unclassified". Accordingly, access to the contents in a secured file classified as "top secret" requires more than just the file key, while the access to the same in a secured file classified as "unclassified" requires no more than the me key.

According to one embodiment, the security clearance information 107 includes another layer of encryption of the file key with another key referred to herein as a clearance key. An authorized user must have a clearance key of proper security level in addition to an authenticated user key and proper access privilege to retrieve the file key. As used herein, a user key or a group key is a cipher key assigned to an authenticated user and may be used to access a secured file or secure a file, or create a secured file. The detail of obtaining such a user key upon a user being authenticated is provided in U.S. patent application Ser. No. 10/074,804.

According to another embodiment, the security clearance information 107 includes a set of special access rules to guard the file key. The retrieval of the file key requires that the user passes an access rule measurement. Since access privilege of a user may be controlled via one or more system parameters (e.g., a policy), the access rule measurement can determine if the user has sufficient access privilege to retrieve the file key in conjunction with the corresponding user key. With the detailed description to follow, those skilled in the art can appreciate that other forms of the security clearance information 107 may be possible. Unless otherwise specified, the following description is based on the security clearance information 107 being another layer of encryption with one or more clearance keys.

In accordance with the security clearance information 107, a user may be assigned a hierarchical security clearance level based on, perhaps, a level of trust assigned to the user. A level of trust implies that one user may be more trusted than another and hence the more trusted user may access more classified files. Depending on implementation, a level of trust may be based on job responsibility of the user or a role of the user in a project or an organization background checks, psychological profiles, length of service, etc. In any case, a level of trust assigned to the user augments additional aspect to the access privilege of the user such that the user must have proper security clearance to access a classified secured file even if the user is permitted by the access rules to access the file.

As will be further described in detail below, unless the level of security clearance of the user permits, a secured classified file (i.e., the file that is both secured and classified) may not be accessed even if the user has an authenticated user (or group) key and permitted by the access rules in the secured classified file. In one embodiment, the level of security clearance of the user is determined by one or more clearance keys assigned thereto. In general, a clearance key permits a user to access a secured file classified as "top secret", the same clearance key may permit the user to access all secured files classified less secure, such as "confidential", where it has been assumed that the user has proper access privilege to be granted by the access rules in the file.

In general, a header is a file structure, preferably small in size, and includes, or perhaps links to, security information about a resultant secured document. Depending on an exact implementation, the security information can be entirely included in a header or pointed to by a pointer that is included in the header. According to one embodiment, the access rules 104, as part of the security information, are included in the header 106. The security information further includes the file key and/or one or more clearance keys, in some cases, an off-line access permit (e.g. in the access rules) should such access be requested by an authorized user. The security information is then encrypted by a cipher (i.e., an en/decryption scheme) with a user key associated with an authorized user to produce encrypted security information 110. The encrypted header 106, if no other information is added thereto, is attached to or integrated with the encrypted data portion 112 to generate the resultant secured file 108. In a preferred embodiment, the header is placed at the beginning of the encrypted document (data portion) to facilitate an early detection of the secured nature of a secured file. One of the advantages of such placement is to enable an access application (i.e., an authoring or viewing tool) to immediately activate a document securing module (to be described where it deems appropriate) to decrypt the header if permitted. Nevertheless, there is no restriction as to where the encrypted header 106 is integrated with the encrypted data portion 112.

It is understood that a cipher may be implemented based on one of many available encryption/decryption schemes. Encryption and decryption generally require the use of some secret information, referred to as a key. For some encryption mechanisms, the same key is used for both encryption and decryption; for other mechanisms, the keys used for encryption and decryption are different. In any case, data can be encrypted with a key according to a predetermined cipher (i.e., encryption/decryption) scheme. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any cipher scheme that is effective and reliable may be used. Hence, the details of a particular scheme are not further discussed herein so as to avoid obscuring aspects of the present invention.

In essence, the secured document 108 includes two parts) the encrypted data portion 112 (i.e., encrypted version of the document itself) and the header 110 that may point to or include encrypted security information for the secured document 108. To access the contents in the encrypted data portion 112, one needs to obtain the file key to decrypt the encrypted data portion 112. To obtain the file key, one needs to be authenticated to get a user or group key and pass an access test in which at least the access rules in the security information are measured against the user's access privilege (i.e., access rights). If the secured file is classified, it further requires a security level clearance on the user. In general, the security clearance level of the user must be high enough before the file key can be retrieved.

Figure 2A:
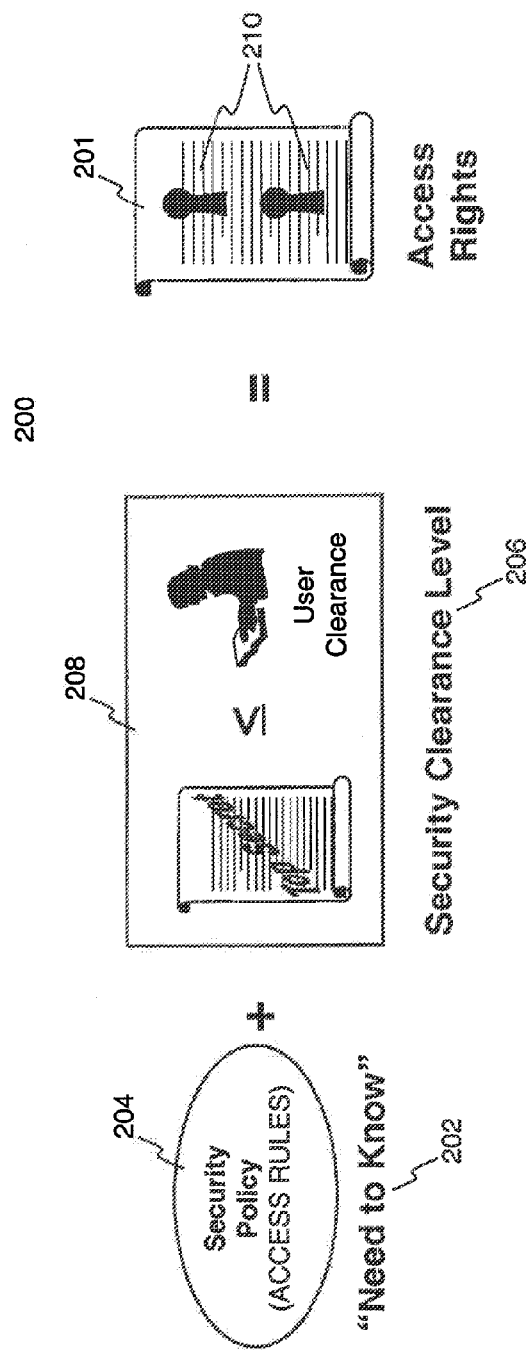
FIG. 2A shows a diagram of what is referred to herein as a two-pronged access scheme according to one embodiment of the present invention.

FIG. 2A shows a diagram 200 of what is referred to herein as a two-pronged access scheme according to one embodiment of the present invention. To access a secured file 201, a user needs to have access privilege based on a condition of "need to know" 202 that is to be measured against by the access rules 204 embedded in the secured file 201. If the secured file 201 is classified, the user must also have a higher security clearance level 206 that is measured against by the security clearance information 208 (e.g., one or more clearance keys. In other words, there are at least two key holes 210 that must be "inserted" with two proper keys before the secured classified file can be accessed.

Figure 2B:
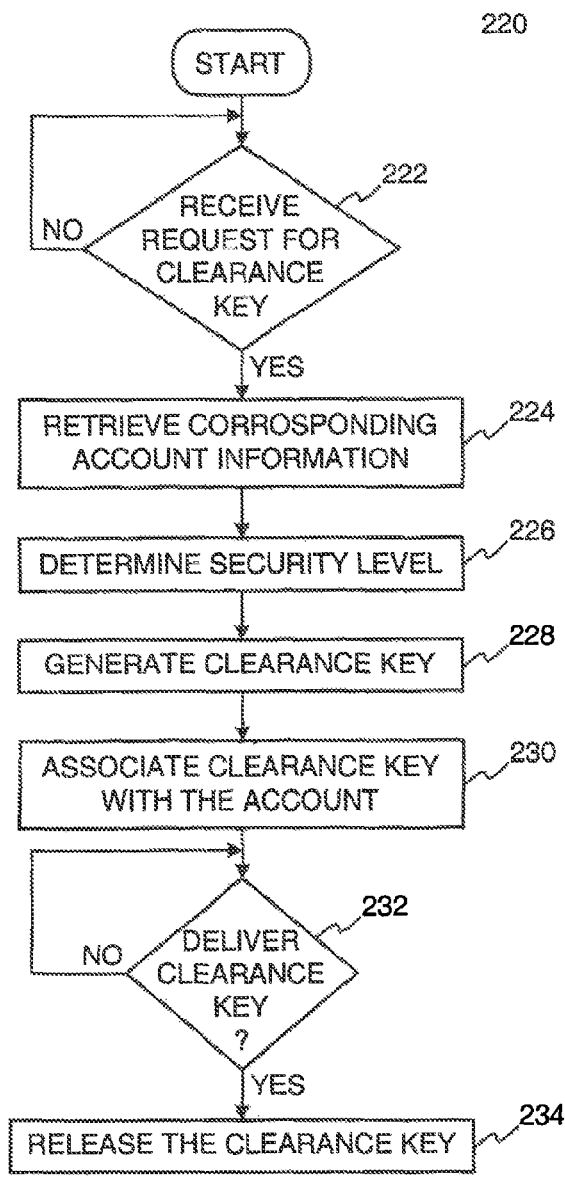
FIG. 2B shows a flowchart of a process for granting a proper security clearance level (i.e., a clearance key) according to one embodiment of the present invention.

FIG. 2B shows a flowchart 220 of process for granting a proper security clearance level (i.e., a clearance key) according to one embodiment of the present invention. The process 220 can be initiated with a request for a clearance key. Depending on implementation, the process 220 may be implemented in a machine (e.g., a central server, a local server or a client machine) that provides access control management to all secured files, perhaps, in an inter/intra enterprise environment, or a combination of a local client machine used by users and the machine.

At 222, the process 220 awaits a request for a clearance key. It is described that a secured file can be classified or unclassified. When it is determined that a user needs to access a secured file that is classified, such request is provided to activate the process 220. In general, the request pertains to a specific user or some members in a group. At 224, a corresponding account for the user is retrieved, provided there is the account for the user. If the account is not available, then the account shall be opened accordingly. Alternatively, the process 220 may be part of the process of opening an appropriate account for a user who has the need to-know basis to access secured files at certain security or confidential level(s). Depending on implementations the corresponding account information may include a username or identifier, membership information, designated access privilege, and a corresponding user key (which sometimes is a pair of a private key and a public key). At 226, a security level for the user is determined, which is usually done by the necessity. For example, an executive of an enterprise may be assigned the highest security clearance level and a front desk receptionist may be assigned the lowest security clearance level. Once the security level is determined, a clearance key is generated at 228.

Figure 2C:
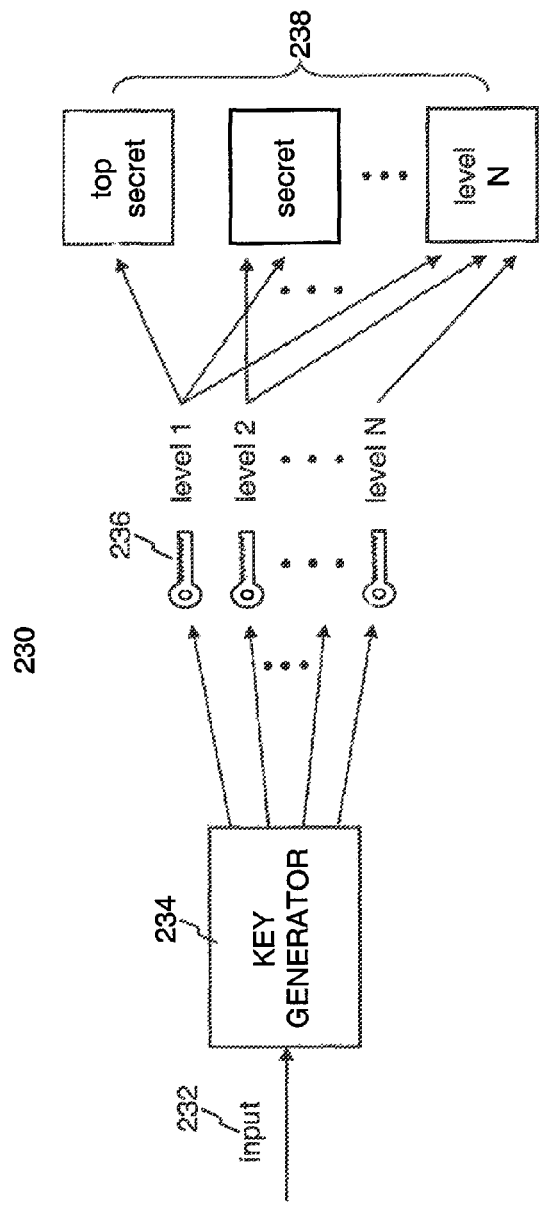
FIG. 2C shows a diagram of generating a clearance key according to one embodiment of the present invention.

Referring now to FIG. 2C there is shown a diagram of generating a clearance key according to one embodiment of the present invention. A key generator 244 receives one or more parameters 242 controlling the security level determined at 226 of FIG. 2B to generate a sequence of alphanumeric or binary numbers as a key. Whether using a secret-key cryptosystem or a public-key cryptosystem, one needs a good source of random numbers for key generation. The main features of a good source are that it produces numbers that are unknown and unpredictable by potential adversaries. There are many ways to generate such numbers, for example, random numbers can be obtained from a physical process. Another approach is to use a pseudo-random number generator fed by a random seed. In any case, depending on the input 242, the generator 244 is configured to generate a clearance key of proper security level $1n$ one embodiment, the key generator 244 generates keys 246 of different lengths, each of the keys 246 corresponds to a security level 236. In another embodiment, the keys 246 generated by the key generator 244 is embedded with a signature signifying a security level. Other methods of specifying a security level of a clearance key are possible. Although it is possible to implement in such a way that each clearance key with a certain security level can only access secured files classified in the same security level, it is preferable to permit a clearance key with a higher security level to access secured files classified in the lower security levels. In other words, a clearance key in level 1 (i.e., the highest security level primarily designated to secured files classified as "top secret") can be used to access all secured classified files 248, while a clearance key in level 2 can be used to access all secured classified files 248 except for those classified as "top secret". Likewise, a clearance key in level N can be only used to access secured files in security level N. One of the advantages for such arrangement is that a user needs only to have one clearance key, if the user has the need to access those secured classified files.

FIG. 2D shows a diagram of generating a clearance key according to another embodiment of the present invention. The key generator 244 receives one or more parameters 242 controlling the security level determined at 226 of FIG. 2B to generate a number of sets of alphanumeric or binary numbers as a primary key 246 and auxiliary keys 247. The primary key 246 is the one being requested, generated in accordance with the determined security level and can be used to facilitate the access to a secured file classified at a security or confidentiality level. The auxiliary keys 247 are those keys generated to facilitate the access to secured files classified less than the security or confidentiality level. As shown in the figure, it is assumed that the primary key 246 is for accessing a secured file classified at level 2. Accordingly, the auxiliary keys 247 can be respectively used to access secured files classified level 3, level 4, . . . to level N, all less than level 2 in terms of security or confidentiality. To facilitate the description of the present invention, the following description is based on FIG. 2C.

Returning to FIG. 2B, after a proper clearance key is generated at 228, the clearance key is associated with the account at 230 so that the user will use the correct key to access a secured file that requires a clearance key. The process 220 now awaits any call for the clearance key at 232. Depending on implementation, the clearance key may be stored locally or remotely and retrievable only when there is a need for it to access a classified secured file. When a non-secured classified file is accessed, the clearance key is not needed and therefore will not be released to or activated for the user. When a secured classified file is accessed, the process 220 goes to 234, wherein the clearance key is released to the user to facilitate the retrieval of the file key in the secured file.

Figure 3A:
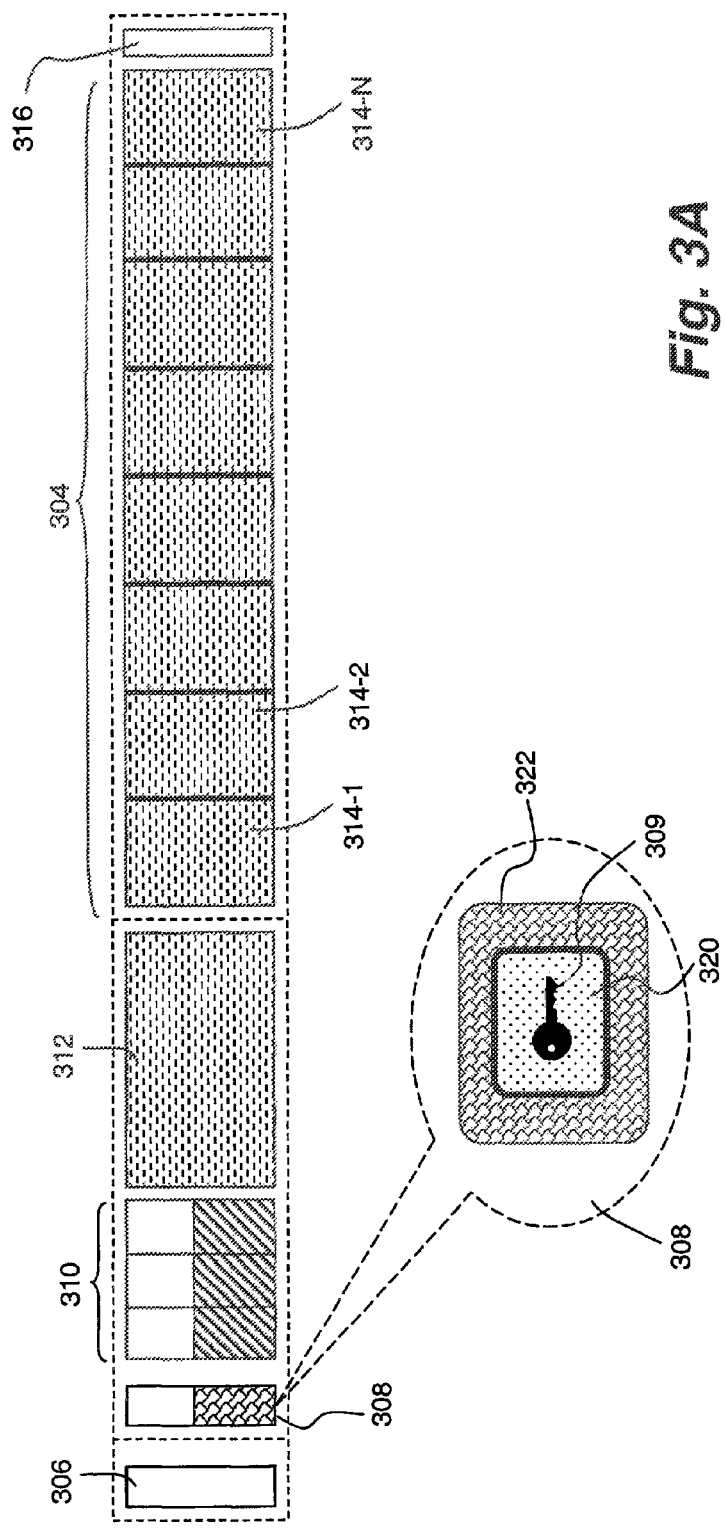
FIG. 3A illustrates, an exemplary structure of a secured file including a header and an encrypted data, portion.

FIG. 3A illustrates an exemplary structure of a secured file 300 including a header 302 and an encrypted data portion 304. Depending on implementation, the header 302 may or may not include a flag or signature 306. In one case, the signature 306 is used to facilitate the detection of the security nature of a secured file among other files. The header 302 includes a file key block 308, a key block 310 and a rule block 312. The file key block 308 includes a file key 309 that is encrypted by a cipher with a protection key 320 (i.e., a doc-key key sometimes) and further with the clearance key 322 associated with a user who attempts to access the secured file 300. Alternatively, the file 309 is encrypted with the clearance key 322 and then the protection key 320. The protection key 320 is encrypted and stored in the key block 310. In general, the key block 310 has an encrypted version of the protection key 320 and can be only accessible by designated user(s) or group(s). There may be more than one key blocks in a header, wherein three key blocks are shown in FIG. 3A. To recover or retrieve the protection key 320, a designated user must have proper access privilege to pass an access rule test with the embedded access rules in the rule block 312.

All access rules are encrypted with a user key (e.g., a public user key) and stored in the rule block 312. A user attempting to access the secured file uses must have a proper user key (e.g., a private user key) to decrypt the access rules in the rule block 312. The access rules are then applied to measure the access privilege of the user. If the user is permitted to access the secured file in view of the access rules, the protection key 320 in the key block 310 is retrieved to retrieve the file key 309 so as to access the encrypted data portion 304. However, when it is detected that the secured file is classified, which means that the file key cannot be retrieved with only the protection key, the user must possess a clearance key. Only does the user have the clearance key, together with the retrieved protection key 320, the file key 309 may be retrieved to proceed with the decryption of the encrypted data portion 304.

According to one embodiment, the encrypted data portion 304 is produced by encrypting a file that is non-secured. For example, a non-secured document can be created by an authoring tool (e.g., Microsoft Word). The non-secured document is encrypted by a cipher with the file key. The encryption information and the file key are then stored in the security information.

According to another embodiment, the non-secured document (data) is encrypted using the following aspects, a strong encryption using a CBC mode, a fast random access to the encrypted data, and an integrity check. To this end, the data is encrypted in blocks. The size of each block may be a predetermined number or specific to the document. For example, the predetermined number may be a multiple of an actual encryption block size used in an encryption scheme. One of the examples is a block cipher (i.e., a type of symmetric-key encryption algorithm that transforms a fixed-length block of plaintext (unencrypted text) data into a block of ciphertext (encrypted text) data of the same length. This transformation takes place under the action of a cipher key (i.e., a file key). Decryption is performed by applying the reverse transformation to the ciphertext block using another cipher key or the same cipher key used for encryption. The fixed length is called the block size, such as 64 bits or 128. Each block is encrypted using a CBC mode. A unique initiation vector (IV) is generated for each block.

Other encryption of the non-secured data can be designed in view of the description herein. In any case, the encryption information and the file key are then stored in the security information. One of the important features in the present invention is that the integration of a header and the encrypted data portion will not alter the original meaning of the data that is otherwise not secured. In other words, a designated application may still be activated when a secured the is selected or "clicked". For example, a document "xyz.doc", when selected, will activate an authoring tool, Microsoft Word, commonly seen in a client machine. After the document "xyz.doc" is secured in accordance with the present invention, the resultant secured file is made to appear the same, "xyz.doc" that still can activate the same authorizing tool, except now the secured file must go through a process to verify that a user is authenticated, the user has the proper access privilege and sufficient security clearance.

Another one of the important features in the present invention is the use of the protection key. With the protection key, the file key can be updated without having to modify the key blocks. For example, the file key in the file key block 308 can be updated without having to modify the key-blocks. This feature helps improve security of the secured files and make file copy operations work faster.

FIG. 3B shows an exemplary header structure 350 of a secured file according to one embodiment of the present invention. In general, a header of a secured file is a point of entry to the secured file. The header structure 350 includes various security information to ensure that only an authorized user with sufficient access privilege can access the encrypted data in the secured file. The security information is cryptographically protected or secured. In one embodiment, a good part of the header or the security information therein is protected by a Message Authentication Code (MAC) that can detect any tempering with the header by an unauthorized user without a valid decryption key or CRC 316 of FIG. 3A.

The header structure 350 is preferably structured in a descriptive language such as a markup language. Examples of such a markup language include HTML, WML, and SGML. In a preferred embodiment, the markup language is Extensible Access Control Markup Language (XACML) that is essentially an XML specification for expressing policies for information access. In general, XACML can address fine grained control of authorized activities, the effect of characteristics of the access requestor, the protocol over which the request is made, authorization based on classes of activities, and content introspection (i.e., authorization based on both the requestor and attribute values within the target where the values of the attributes may not be known to the policy writer). In addition, XACML can suggest a policy authorization model to guide implementers of the authorization mechanism.

One portion in the header structure 350 is referred to as a key block list 352 that may contain one or more key blocks. A key block 354 contains an encrypted protection key that is sometimes referred to as document/file-encryption-key key, namely a key to the file key. To ensure that the protection key is indeed protected, it is encrypted and can only be retrieved by a designated entity. For example, a secured file is created by a member of engineering group and permitted for full access by every member in the engineering group. The same secured file meanwhile is also permitted for limited access (e.g., only read and print) by every member in the marketing group. Accordingly, the key block list 352 may include two key blocks, one for the engineering group and the other for the marketing group. In other words, each of the two key blocks has an encrypted protection key that can be only accessed by a member of the corresponding group (via a group or individual private key).

The key block version value 356 provides necessary details of the encryption algorithm used to protect the protection key 340. In one embodiment, the RSA-OAEP (RSA—Optimal Asymmetric Encryption Padding) which is a public-key encryption scheme combining the RSA algorithm with the OAEP method is used. In particular, the druid of the key pair 358 identifies a certificate and a private key (the details thereof are not shown) that are used to decrypt this value. In addition, attributes of the key pair, such as whether the key is 1024 or 2048 bits long, are also included to facilitate the protection of the protection key 340.

The block 342 of the header structure 350 includes at least three segments 344, 346 and 348. The segment 344 includes an encrypted file key that must be retrieved in clear to decrypt the encrypted data portion. The segment 346 includes security level information to indicate what security level the secured file is at, for example, "top secret", "secret", "confidential" or "unclassified" or "none". The segment 348 includes information about the size of the encryption block for the encrypted data portion in the secured file. According to one embodiment, this is a multiple of the algorithm encryption block size. The encrypted data portion is created by an encryption with a symmetric key that is called the document/file-encryption-key or file key herein.

There is another portion 360 of the header structure 350 that is encrypted by a user or group key. The portion 360 (the details thereof are not shown) contains essentially the access rules embedded with the secured file to govern who/where the secured file can be accessed. Various conditions of accessing the file can be placed or realized in the access rules. Additional details of the access rules can be references in U.S. patent application Ser. No. 10/074,804.

The above description is based on one embodiment in which the access rules are encrypted with a user's public key. Those skilled in the art can appreciate that the access rules may be also encrypted with a file encryption key (i.e., the file key) or the protection key. In this case, the protection key is encrypted with a user's public key or together with a clearance key associated with the user if a subject secured file is secured. Now instead of retrieving the protection key after the access rules are successfully measured against access privilege of the user attempting to access a secured file, the protection key is retrieved first with a user's private key. The protection key can be used to retrieve the access rules that are subsequently used to measure against the access privilege of the user if the protection key was used to encrypt the access rules. If the user is permitted to access the contents in the file, the file key is then retrieved with the protection key (or together with the clearance key). Alternatively, right after the protection key is retrieved, the protection key (or together with the clearance key) is used to retrieve the file key. The file key is then to retrieve the access rules that are subsequently used to measure against the access privilege of the user. In any case, if the user is determined that the user has sufficient access privilege in view of all access policies, if there are any, the retrieved file key can be used to continue the description of the encrypted data portion.

Figure 4:
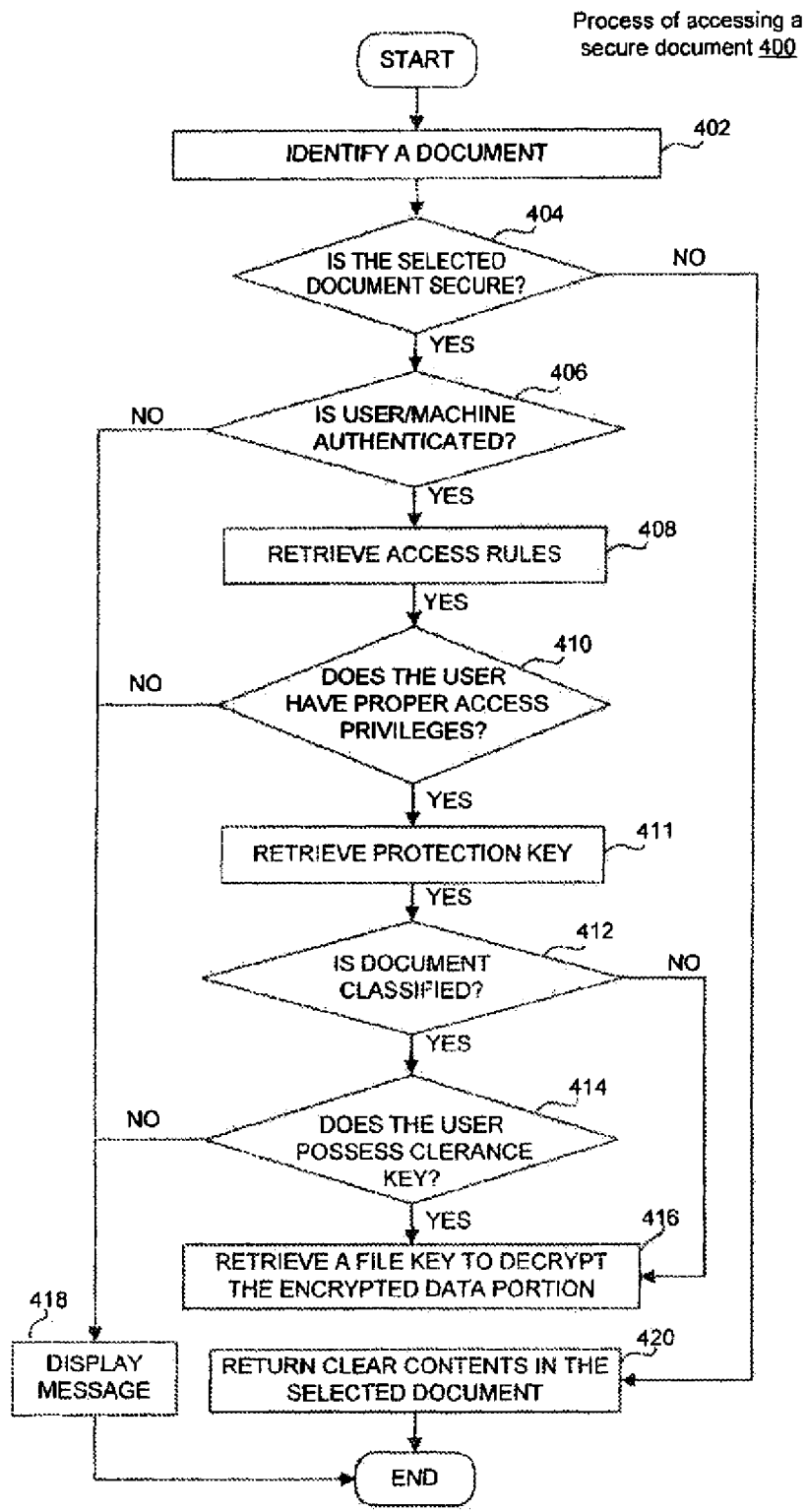
FIG. 4 shows a flowchart of a process for accessing a secured document according to one embodiment of the present invention and may be understood in conjunction with FIG. 3A and FIG. 3B.

FIG. 4 there is shown a flowchart of process 400 for accessing a secured document according to one embodiment of the present invention and may be understood in conjunction with FIG. 3A or FIG. 3B. The process 400 may be implemented in an executable module (e.g., document securing module) that can be activated when a user intends to access a secured document for example, a user is using a client machine running a Microsoft Windows operating system to access a secured document stored in a folder, a local, or remote store. By activating a Window Explorer or Internet Explorer, the user may display a list of files, some are non-secured and others are secured. Among the secured files, some of them are classified and secured in the manner in accordance with FIG. 3A. Within the display of the list of tiles, a desired one can be selected. Alternatively, a desired file may be selected from an application, for example, using "open" command under File of Microsoft Word application.

In any case, at 402, such desired document is identified to be accessed. Before proceeding with the selected document, the process 400 needs to determine whether the selected file is secured or non-secured. At 404, the selected document is examined. In general, there are at least two ways to examine the secure nature of the selected document. A first possible way is to look for a flag or signature at the beginning of the document As described above, in some secured documents, a flag, such as a set of predetermined data, is placed in the header of a secured document to indicate that the document being accessed is secured. If no such flag is found, the process 400 goes to 420, namely, the selected documented is assumed non-secured and thus allowed to pass and load to a selected application or place desired by the user. A second possible way is to look for a header in a selected document. Being a secured document, there is a header attached to an encrypted data portion. The data format of the header shall be irregular in comparison with the selected document if it is non-secured. If it is determined that the selected document has no irregular data format as required by a selected application, the process 400 goes to 420, namely, the selected document is assumed to be non-secured and thus allowed to pass and load to a selected application or place desired by the user.

Now if it is determined at 404 that the selected document is indeed secured, the process 400 goes to 406, wherein the user and/or the client machine being used by the user are checked to determine if the user and/or the client machine are authenticated. The details of the user authenticating himself/herself/itself may be provided in U.S. patent application Ser. No. 10/074,804. In the case that the user and/or the client machine are not authenticated, the process 400 goes to 418 that may display an appropriate error message to the user. It is now assumed that the user and/or the client machine are authenticated, the header or security information therein is decrypted with the authenticated user key.

At 408, the access rules in the decrypted security information are retrieved. As described above, there may be sets of access rules, each set designated for a particular user or members of a particular group. With the authenticated user key and/or a corresponding user identifier, a corresponding set of access rules is retrieved. At 410, the retrieved access rules are compared to (or measured against) the access privileges associated with the user. If the measurement fails, which means that the user is not permitted to access this particular document, a notification or alert message may be generated to be displayed to the user at 418. If the measurement passes successfully, which means that the user is permitted to access this particular document, the process 400 moves on to decrypt and retrieve the protection key at 411 and then determine if the secured document is classified at 412. When it is determined that the secured document is not classified or there is no security clearance requirement in the security information, the process 400 goes to 416, wherein a file key is retrieved and, subsequently, used to decrypt the encrypted data portion in the selected (secured) document. When it is determined that the secured document is classified, the process 400 goes to 414 that checks if the authenticated user possesses a clearance key matching the security clearance requirement in general, the security level of the clearance key must be equal to or higher than the security clearance requirement in the secured classified document. If the security level of the clearance key is not sufficient enough, the process 400 goes to 418 that can be configured to display an appropriate error message to the user. If the security level of the clearance key is sufficient enough, the process 400 goes to 416.

In any case, a file key is retrieved with the protection key alone if the secured document is not classified or the protection key together with the clearance key if the secured document is classified. As a result, the decrypted document or clear contents of the selected document is provided at 420.

Figure 5:
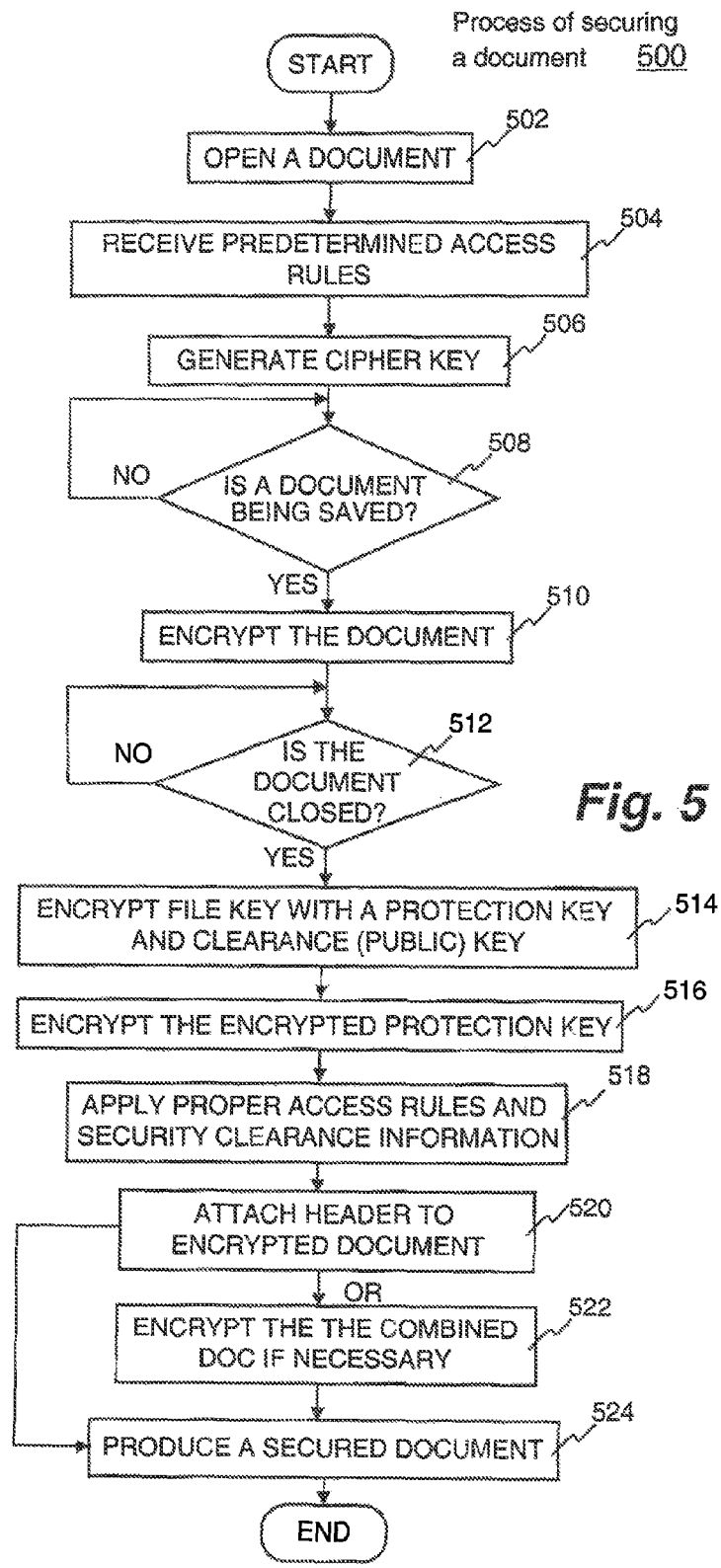
FIG. 5 shows a flowchart of a process for securing a file or document being created according to one embodiment of the present invention.
Figure 2B:
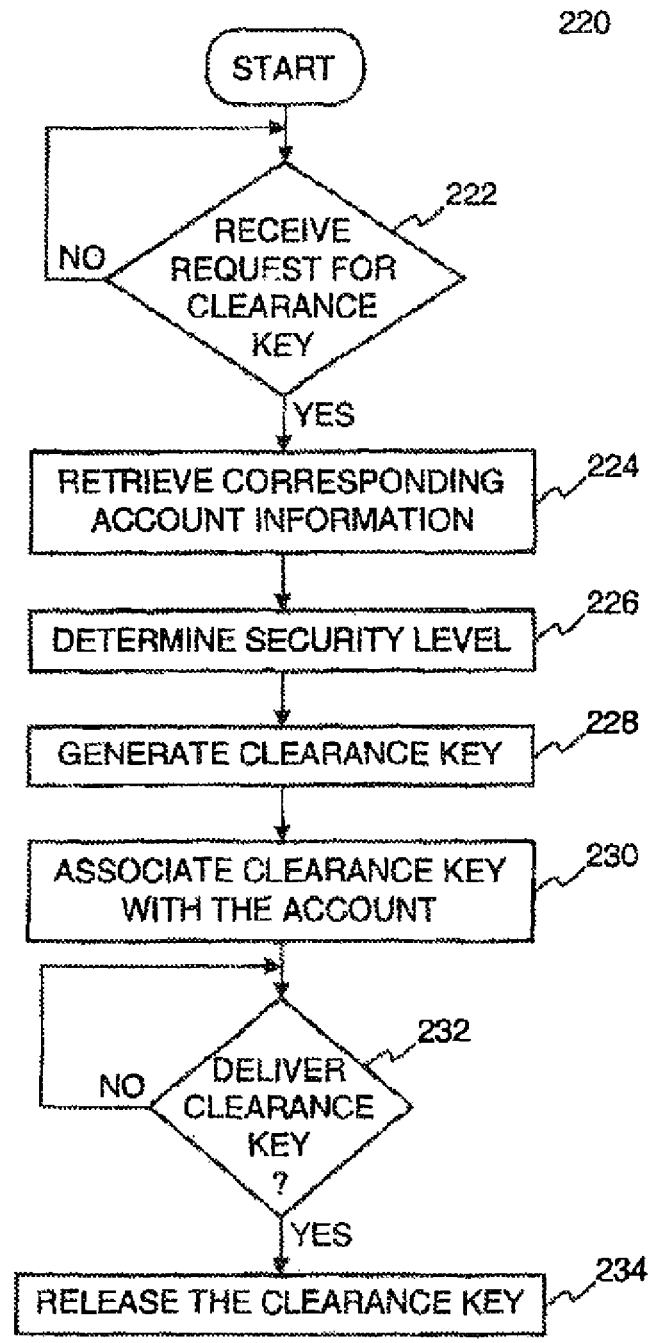

FIG. 5 shows a flowchart of a process 500 for securing a file or document being created according to one embodiment of the present invention. The process 500 may be understood in conjunction with a client machine running a Microsoft Windows operating system. However, it is clear to those skilled in the art that the description herein or the invention does not imply such limitations.

At 502, a blank document is opened or created by an authoring application chosen and activated by a user. The authoring application may be Microsoft Word, Microsoft PowerPoint or WordPerfect in a preferred procedure, the user may save the document into a folder or a protected store that has already setup with a set of access rules. If not, one or more sets of access rules may be created. Optionally, the access rules may be received by importation of a previously created file including desirable access rules, defaults of the user access privileges or individually created user access privileges. At 504, the set of predetermined access rules is received, preferably, in a descriptive language such as a plain test or a markup language (e.g., XACML).

At 506, a secret cipher key (i.e., a file key) is generated from a cipher module for the document and typically stored in a temp file that is generally not accessible by an ordinary user. The temp file will be erased automatically when the secured document is done (e.g., at a "Close" command from the application). At 508, the document is checked to see if a request to write the document into a local store is made. If such request is detected (which could be made manually by the user or periodically by the authoring tool or an OS procedure), the document is encrypted with the file key at 510. One of the features in the present invention is that the stored document is always encrypted in storage even if it is still being processed (e.g., authored, edited or revised). When the user is done with the document, a "Close" request is activated to close the document. At 512, such a request is detected. As soon as such request is received, it means that a secured version of the document needs to be written into the store. At 514, it is assumed that the document is classified and that that user who is working with the document has been previously assigned a clearance key. The generated file key is then encrypted with a protection/clearance key and further with a clearance/protection key. The protection key may be generated from a cipher module. At 516, the protection key is encrypted with the authenticated user key.

To protect the encrypted protection key, at 518, appropriate access rules are applied and inserted along with the encrypted protection key in the security information that may be further encrypted with the authenticated user key. The encrypted version of the security information is then packed in the header. Depending on implementation, a flag or signature can be further included in the header. Alternatively, the header could include the security information without a flag. At 520, the header is attached to or integrated with the encrypted document from 510 and subsequently the secured document is placed into the store at 524.

As described above, the secured document includes two encrypted portions, the header with encrypted security information and the encrypted data portion (i.e., the encrypted document). The two parts in the secured documents are encrypted respectively with two different keys, the file key and the user key. Alternatively, the two encrypted portions may be encrypted again with another key (or use the same user key) at 522.

In the case that there are a number of sets of access rules, each for a particular user or a group of users, it can be understood that the encrypted access rules at 518 are integrated with other sets of the encrypted access rules in a rules block as illustrated in FIG. 3A. As such, an access from one user or group will not affect other users or groups but the other users or groups will see perhaps an updated version of the encrypted document.

FIG. 6 shows an exemplary implementation 600 of the present invention. A client machine used by a user to access a secured file or secure a created file executes an operating system (e.g., WINDOWS 2000/NT/XP) and may be viewed to have two working modes, one being the user mode and the other being the OS mode. A client module 602 representing an executable version of the present invention is configured to interact with and operate within an operating system 604 to ensure that a document is made secured and a secured document can be accessed only by an authorized user. One of the features of the client module 604 is that the operations thereof are transparent to the user. In other words, the user is not made aware of the operations of the client module 604 when accessing a secured document or securing a document.

An application 606 (e.g. a registered application, such as Microsoft Word) operates in the user mode or the OS 604 and may be activated to access a document stored in a store 608. The store 608 may be a local storage place (e.g., hard disk) or remotely located (e.g., another device). Depending on the security nature (secured vs. non-secured) of the document being accessed, the client module 602 may activate a key store 609 (or an interface thereto) and a cipher module 610. The key store 609 retains an authenticated user key after the user is authenticated. If the user has the need to access soma secured classified files, the key store 609 may retain a corresponding clearance key. Depending on implementation, the key store 609 may be configured to retrieve a clearance key from another location or activate a clearance key from an encrypted version thereof. The cipher module 610 implements one or more an/decryption schemes and is, preferably, modular so that a different cipher module implementing alternative en/decryption schemes may be readily used, if desired.

According to one embodiment, the client module 202 is analogous in many ways to a device driver that essentially converts more general Input/output instructions of an operating system to messages that a device/module being supported can understand. Depending on the OS in which the present invention is implemented, the client module 602 may be implemented as a VxD (virtual device driver), a kernel or other applicable format.

In operation, the user selects a document that is associated with an application 606 (e.g., MS WORD, PowerPoint, or printing). The application 606 acts on the document and calls an API (e.g., createFile, a Common Dialog File Open Dialog with Win32 API in MS Windows) to access the installable file system (IFS) manger 612. If it Is detected that an "Open" request is made from the application 206, the request is passed to an appropriate file system driver (FSD) 614 to access the requested document. When it is detected that the requested document is secured, the key store 209 and the cipher module 610 are activated and an authenticated user (private) key is retrieved. The encrypted security information in the header of the requested secure document is decrypted with the user key. Now the access rules in the secured document are available, a rules measurement is carried out in the client module 602 to determine if the user is permitted to access the selected secured document. If the measurement is successful, that means the user is permitted to access the secured document, a file key is retrieved from the security information with a retrieved protection key as well as the clearance key and, subsequently, the cipher module 610 proceeds to decrypt the encrypted document (i.e., the encrypted data portion) in the client module 602. The clear contents are then returned to the application 606 through the IFS manager 612. For example, if the application 606 is an authoring tool, the clear contents are displayed. If the application 606 is a printing tool, the clear contents are sent to a designated printer.

In another embodiment, an operating system (OS) access, known as the ProcessID property, can be used to activate an application (as an argument to the AppActivate method). The parameter ProcessID identifies the application and an event handler thereof takes necessary parameters to continue the OS access to the Installable File System (IFS) Manager 612 that is responsible for arbitrating access to different file system components. In particular, the IFS Manager 612 acts as an entry point to perform various operations such as opening, closing, reading, writing files and etc. With one or more flags or parameters passed along, the access activates the client module 602. If the document being accessed by the application is regular (non-secured), the document will be fetched from one of the File System Driver (FSD) (e.g., FSD 614) and passed through the client module 602 and subsequently loaded into the application through the IFS Manager 612. On the other hand, if the document being accessed by the application is secured, the client module 602 activates the key store 609 and the cipher module 610 and proceeds to obtain an authenticated user key to retrieve the access rules therein. Pending the outcome from the access test module 609, a file key may be retrieved to decrypt the encrypted data portion of the secured document by the cipher in the cipher module 610. As a result, the data portion or the document in clear mode will be loaded into the application through the IFS Manager 612.

The present Invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

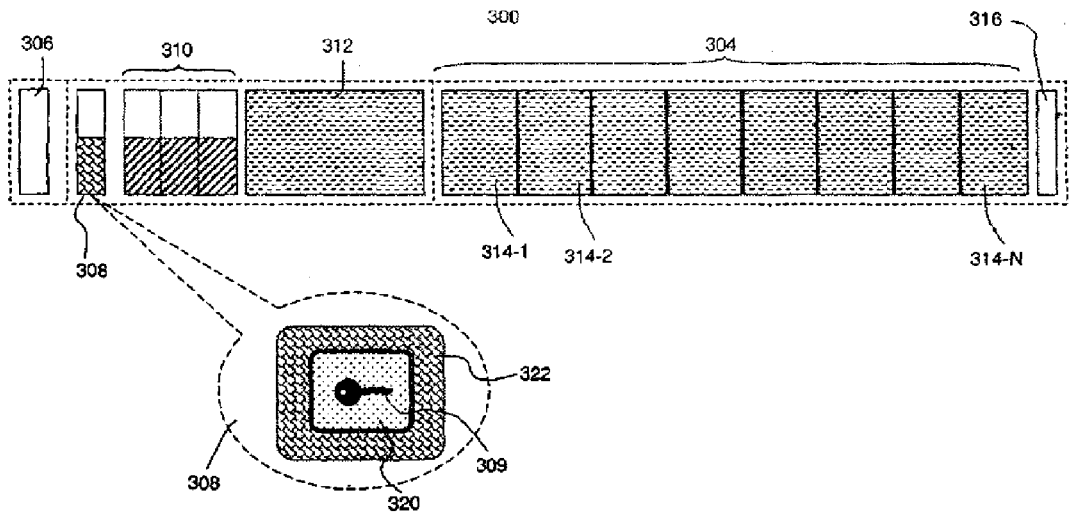

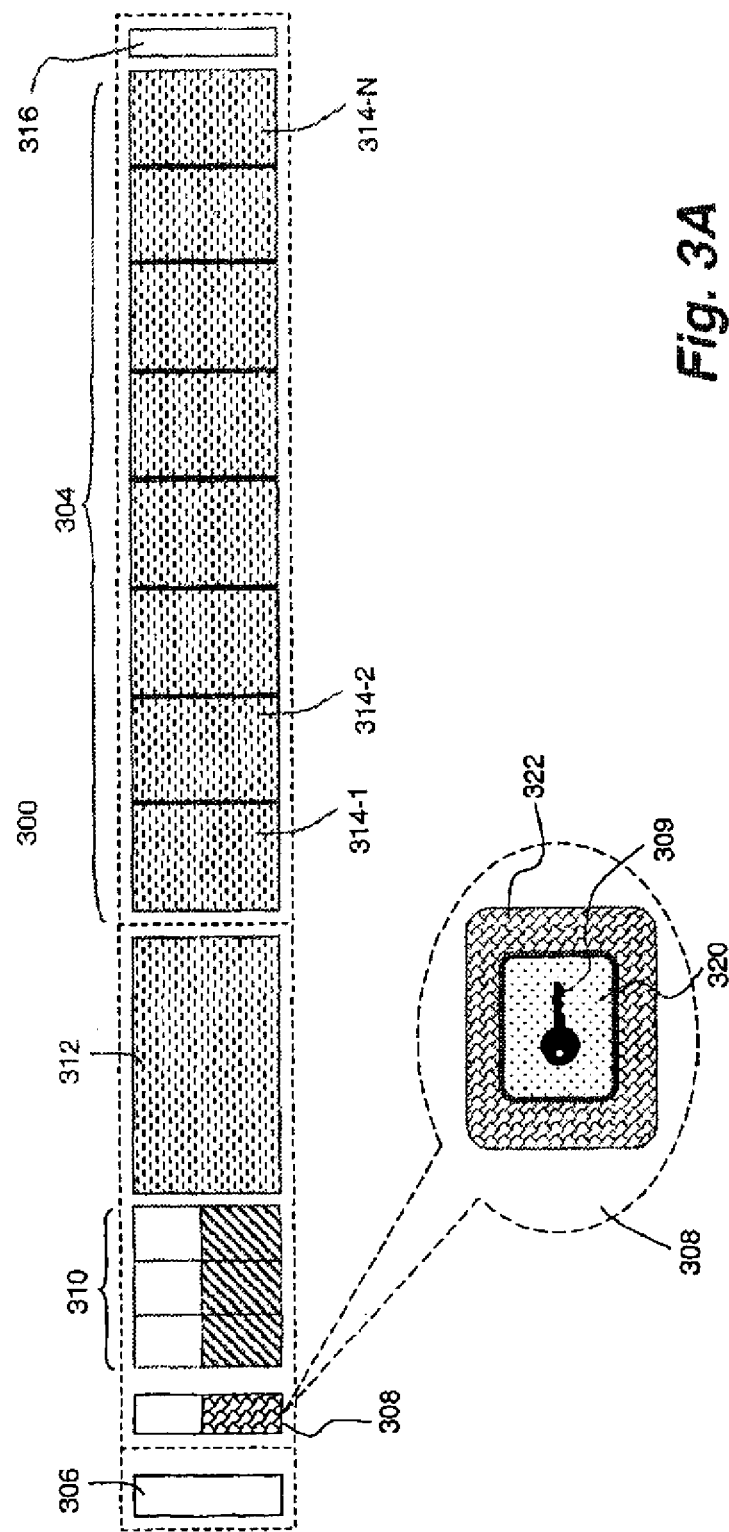

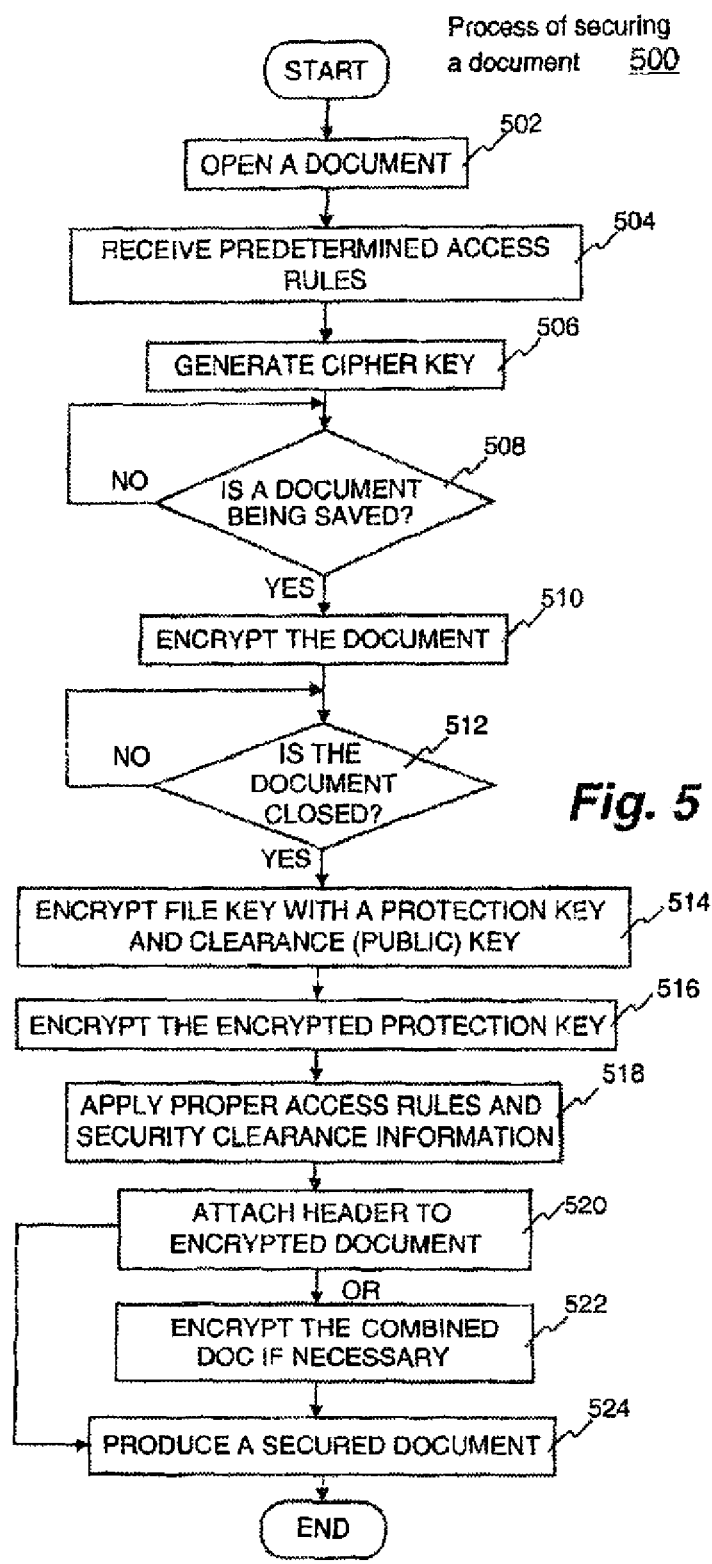

We claim:

1. A method comprising:
reading a classification level of a secured file from a header portion of the secured file; and
decrypting, by a computing machine, a file key using a clearance key, in response to a security clearance level of the clearance key being greater than or equal to the classification level of the secured file,
wherein the file key is encrypted in a portion of the secured file, and
wherein at least two user identifiers are assigned a security clearance level corresponding to the security clearance level of the clearance key, the at least two user identifiers are thereby granted access to use the clearance key, and represent members of a group of users assigned to the security clearance level, and access to use the clearance key is granted to members in the group, such that members in the group can access the secured file with the clearance key.

2. The method of claim 1, wherein reading the classification level comprises reading the classification level from a set of a plurality of classification levels.

3. The method of claim 1, wherein the at least two user identifiers are assigned to the security clearance level based on a level of trust of users associated with the at least two user identifiers in an organization.

4. The method of claim 3, wherein the level of trust pertains to job responsibility of the users associated with the at least two user identifiers in the organization or a role of the users associated with the at least two user identifiers in a task.

5. The method of claim 3, wherein at least one of the users associated with the at least two user identifiers is a human user, a group of users or a member thereof, a software agent, a device, or an application.

6. The method of claim 1, wherein at least one of the at least two user identifiers is additionally associated with a user key.

7. The method of claim 6, wherein the header portion of the secured file is encrypted, further comprising decrypting the header portion with the user key after authentication by the at least one of the at least two user identifiers associated with the user key.

8. The method of claim 7, wherein decrypting the header portion of the secured file comprises accessing an encrypted version of the file key.

9. The method of claim 1, further comprising:
releasing or activating the clearance key for a corresponding user identifier of the at least two user identifiers when the corresponding user identifier is accessing the secured file.

10. A non-transitory computer-readable storage medium having instructions stored thereon, execution of which, by a computing device, causes the computing device to perform operations comprising:
reading a classification level of a secured file from a header portion of the secured file; and
decrypting a file key using a clearance key, in response to a security clearance level of the clearance key being greater than or equal to the classification level of the secured file,
wherein the file key is encrypted in a portion of the secured file, and
wherein at least two user identifiers are assigned a security clearance level corresponding to the security clearance level of the clearance key, the at least two user identifiers are thereby granted access to use the clearance key, and represent members of a group of users assigned to the security clearance level, and access to use the clearance key is granted to members in the group, such that members in the group can access the secured file with the clearance key.

11. The non-transitory computer-readable storage medium of claim 10, wherein reading the classification level comprises reading the classification level from a set of a plurality of classification levels.

12. The non-transitory computer-readable storage medium of claim 10, wherein the at least two user identifiers are assigned to the security clearance level based on a level of trust of users associated with the at least two user identifiers in an organization.

13. The non-transitory computer-readable storage medium of claim 12, wherein the level of trust pertains to job responsibility of the users associated with the at least two user identifiers in the organization or a role of the users associated with the at least two user identifiers in a task.

14. The non-transitory computer-readable storage medium of claim 12, wherein at least one of the users associated with the at least two user identifiers is a human user, a group of users or a member thereof, a software agent, a device, or an application.

15. The non-transitory computer-readable storage medium of claim 10, wherein at least one of the at least two user identifiers is additionally associated with a user key.

16. The non-transitory computer-readable storage medium of claim 15, wherein the header portion of the secured file is encrypted, further comprising decrypting the header portion with the user key after authentication by the at least one of the at least two user identifiers associated with the user key.

17. The non-transitory computer-readable storage medium of claim 16, wherein decrypting the header portion of the secured file comprises accessing an encrypted version of the file key.

18. The non-transitory computer-readable storage medium of claim 10, the operations further comprising:
releasing or activating the clearance key for a corresponding user identifier of the at least two user identifiers when the corresponding user identifier is accessing the secured file.

19. A system comprising:
one or more processors; and
a memory storing software modules executed by the one or more processors comprising:
a reading module configured to read a classification level of a secured file from a header portion of the secured file, and
a decrypting module configured to decrypt a file key using a clearance key, in response to a security clearance level of the clearance key being greater than or equal to the classification level of the secured file,
wherein the file key is encrypted in a portion of the secured file, and
wherein at least two user identifiers are assigned a security clearance level corresponding to the security clearance level of the clearance key, the at least two user identifiers are thereby granted access to use the clearance key, and represent members of a group of users assigned to the security clearance level, and access to use the clearance key is granted to members in the group, such that members in the group can access the secured file with the clearance key.

20. The system of claim 19, wherein reading the classification level comprises reading the classification level from a set of a plurality of classification levels.

21. The system of claim 19, wherein the at least two user identifiers are assigned to the security clearance level based on a level of trust of users associated with the at least two user identifiers in an organization.

22. The system of claim 21, wherein the level of trust pertains to job responsibility of the users associated with the at least two user identifiers in the organization or a role of the users associated with the at least two user identifiers in a task.

23. The system of claim 21, wherein at least one of the users associated with the at least two user identifiers is a human user, a group of users or a member thereof, a software agent, a device, or an application.

24. The system of claim 19, wherein at least one of the at least two user identifiers is additionally associated with a user key.

25. The system of claim 24, wherein the header portion of the secured file is encrypted, further comprising decrypting the header portion with the user key after authentication by the at least one of the at least two user identifiers associated with the user key.

26. The system of claim 25, wherein decrypting the header portion of the secured file comprises accessing an encrypted version of the file key.

27. The system of claim 19, further comprising:
a releasing or activating module configured to release or activate the clearance key for a corresponding user identifier of the at least two user identifiers when the corresponding user identifier is accessing the secured file.

* * * * *

UNITED STATES PATENT AND TRADEMARK OFFICE
CERTIFICATE OF CORRECTION

PATENT NO. : 8,341,407 B2
APPLICATION NO. : 13/078109
DATED : December 25, 2012
INVENTOR(S) : Kinghorn It is certified that error appears in the above-identified patent and that said Letters Patent is hereby corrected as shown below:

Title Page, illustrative fig. 3A should be deleted and substitute therefor the attached title page, consisting of fig. 3A.

On the Title Page, in Item (57), under "ABSTRACT", in Column 2, Line 6, delete "0pronged" and insert -- pronged --, therefor.

On the Title Page, in the Figure, insert Main Designator -- 300 --.

On Title Page 2, in Item (56), under "U.S. PATENT DOCUMENTS", in Column 2, Line 16, delete "5,912,754 A 6/1999 Koga et al." and insert -- 5,923,754 7/1999 Angelo et al. --, therefor.

On Title Page 3, in Item (56), under "U.S. PATENT DOCUMENTS", in Column 2, Line 67, delete "9,505,941" and insert -- 6,950,941 --, therefor.

On Title Page 3, in Item (56), under "U.S. PATENT DOCUMENTS", in Column 2, Line 68, delete "9,507,936" and insert -- 6,950,936 --, therefor.

On Title Page 7, in Item (56), under "OTHER PUBLICATIONS", in Column 1, Line 22, delete "02258522.7," and insert -- 02258532.7, --, therefor.

On Title Page 7, in Item (56), under "OTHER PUBLICATIONS", in Column 1, Line 35, delete "competion" and insert -- completion --, therefor.

On Title Page 7, in Item (56), under "OTHER PUBLICATIONS", in Column 2, Line 19, delete "Cryptogology," and insert -- Cryptology, --, therefor.

On Title Page 7, in Item (56), under "OTHER PUBLICATIONS", in Column 2, Line 33, delete "Date" and insert -- Data --, therefor.

Signed and Sealed this
First Day of April, 2014

Michelle K. Lee
*Deputy Director of the United States Patent and Trademark Office*

CERTIFICATE OF CORRECTION (continued)
U.S. Pat. No. 8,341,407 B2

In the Drawings

Figs. 2B, 3A, 4, and 5 should be deleted and substitute therefor the attached figures 2B, 3A, 4 and 5 as shown on the attached pages 4-7, sheets 3, 6, 8 and 9 of 10.

In the Specification

In Column 6, Line 24, delete "the me" and insert -- the same --, therefor.

In Column 7, Line 52, delete "parts)" and insert -- parts: --, therefor.

In Column 7, Line 54, delete "header 110" and insert -- header 106 --, therefor.

In Column 8, Line 8, delete "keys." and insert -- keys). --, therefor.

In Column 8, Line 44, delete "2C" and insert -- 2C, --, therefor.

In Column 8, Line 59, delete "level 1n" and insert -- level. In --, therefor.

In Column 10, Line 31, delete "length." and insert -- length). --, therefor.

In Column 10, Line 46, delete "the is" and insert -- file is --, therefor.

In Column 11, Line 46, delete "druid" and insert -- uuid --, therefor.

In Column 12, Line 55, delete "document" and insert -- document. --, therefor.

In Column 14, Line 66, delete "module 604" and insert -- module 602 --, therefor.

In Column 15, Line 1, delete "module 604" and insert -- module 602 --, therefor.

In Column 15, Line 18, delete "an/decryption" and insert -- en/decryption --, therefor.

In Column 15, Line 21, delete "module 202" and insert -- module 602 --, therefor.

In Column 15, Line 34, delete "it Is" and insert -- it is --, therefor.

CERTIFICATE OF CORRECTION (continued)

(12) United States Patent
Kinghorn et al.

(10) Patent No.: US 8,341,407 B2
(45) Date of Patent: *Dec. 25, 2012

(54) METHOD AND SYSTEM FOR PROTECTING ELECTRONIC DATA IN ENTERPRISE ENVIRONMENT

(75) Inventors: Gary Mark Kinghorn, Emerald Hills, CA (US); Denis Jacques Paul Garcia, Palo Alto, CA (US)

(73) Assignee: Guardian Data Storage, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/078,109

(22) Filed: Apr. 1, 2011

(65) Prior Publication Data

US 2011/0296199 A1   Dec. 1, 2011

Related U.S. Application Data

(63) Continuation of application No. 10/159,220, filed on May 31, 2002, now Pat. No. 7,921,284, which is a continuation-in-part of application No. 10/074,804, filed on Feb. 12, 2002, now Pat. No. 7,380,120.

(60) Provisional application No. 60/339,634, filed on Dec. 12, 2001.

(51) Int. Cl.
   *H04L 29/06* (2006.01)
(52) U.S. Cl. ................................ 713/166; 713/160
(58) Field of Classification Search .......... 713/166, 713/182, 189, 160; 726/2; 380/277
See application file for complete search history.

(56) References Cited

U.S. PATENT DOCUMENTS

| 4,203,166 A | 5/1980 | Ehrsam et al. |
| 4,238,854 A | 12/1980 | Ehrsam et al. |
| 4,423,287 A | 12/1983 | Zeidler |
| 4,423,387 A | 12/1983 | Sempel |

(Continued)

FOREIGN PATENT DOCUMENTS

EP    0 672 991 A2    9/1995

(Continued)

OTHER PUBLICATIONS

Adobe Acrobat 5.0 Classroom in a Book, Adobe Press, Jun. 26, 2001, pp. 1-4.

(Continued)

*Primary Examiner* — Ali Abyaneh
(74) *Attorney, Agent, or Firm* — Sterne, Kessler, Goldstein & Fox PLLC

(57) ABSTRACT

Even with proper access privilege, when a secured file is classified, at least security clearance (e.g. a clearance key) is needed to ensure those who have the right security clearance can ultimately access the contents in the classified secured file. According to one embodiment, referred to as a two-0pronged access scheme, a security clearance key is generated and assigned in accordance with a user's security access level. A security clearance key may range from most classified to non-classified. Depending on implementation, a security clearance key with a security level may be so configured that the key can be used to access secured files classified at or lower than the security level or multiple auxiliary keys are provided when a corresponding security clearance key is being requested. The auxiliary keys are those keys generated to facilitate access to secured files classified respectively less than the corresponding security or confidentiality level.

27 Claims, 10 Drawing Sheets